US010495121B2

(12) United States Patent
Smullin et al.

(10) Patent No.: US 10,495,121 B2
(45) Date of Patent: Dec. 3, 2019

(54) METHOD AND APPARATUS FOR COMBINED ANEMOMETER AND PLASMA ACTUATOR

(71) Applicant: X Development LLC, Mountain View, CA (US)

(72) Inventors: Sylvia Joan Smullin, Menlo Park, CA (US); Cyrus Behroozi, Menlo Park, CA (US); Dominico P. Julian, Oakland, CA (US)

(73) Assignee: X Development LLC, Mountain View, CA (US)

( * ) Notice: Subject to any disclaimer, the term of this patent is extended or adjusted under 35 U.S.C. 154(b) by 221 days.

(21) Appl. No.: 15/809,302

(22) Filed: Nov. 10, 2017

(65) Prior Publication Data

US 2019/0145443 A1    May 16, 2019

(51) Int. Cl.
| | |
|---|---|
| *F15C 1/04* | (2006.01) |
| *F15D 1/00* | (2006.01) |
| *F15D 1/12* | (2006.01) |
| *G01F 1/64* | (2006.01) |
| *G01P 5/02* | (2006.01) |
| *B64C 23/00* | (2006.01) |
| *G01P 13/04* | (2006.01) |

(52) U.S. Cl.
CPC .......... *F15D 1/0075* (2013.01); *B64C 23/005* (2013.01); *F15D 1/12* (2013.01); *G01F 1/64* (2013.01); *G01P 5/02* (2013.01); *G01P 13/045* (2013.01)

(58) Field of Classification Search
CPC . F15D 1/0075; F15D 1/12; G01F 1/64; G01P 5/02; G01P 13/045; B64C 23/005
USPC .......... 137/833, 831, 13; 244/175, 198, 205, 244/130, 171.7
See application file for complete search history.

(56) References Cited

U.S. PATENT DOCUMENTS

| | | | |
|---|---|---|---|
| 5,803,409 A | 9/1998 | Keefe | |
| 7,275,013 B1 | 9/2007 | Matlis et al. | |
| 7,380,756 B1 | 6/2008 | Enloe et al. | |
| 7,637,455 B2 * | 12/2009 | Silkey | B64D 33/02 244/204 |

(Continued)

FOREIGN PATENT DOCUMENTS

CN    103471809 A    12/2013

OTHER PUBLICATIONS

Cattafesta et al. "Actuators for Active Flow Control," Annual Review of Fluid Mechanics, Jan. 2011, 29 pages.

(Continued)

*Primary Examiner* — Minh Q Le
(74) *Attorney, Agent, or Firm* — Fish & Richardson P.C.

(57) ABSTRACT

A method and a device for measuring a fluid flow characteristic of an ambient fluid and modifying fluid flow of the ambient fluid, the method including: applying a first voltage between a first electrode and a second electrode, the first voltage being sufficient to generate a plasma in the first space; applying a second voltage between the first electrode and a third electrode, the second voltage being sufficient to generate a plasma in the second space; measuring a first current between the first and second electrodes, and a second current between the first and third electrodes; determining a fluid flow characteristic of the ambient fluid; and applying a third voltage between the first and second electrodes, the third voltage being sufficient to generate a plasma in the first space sufficient to modify fluid flow of the ambient fluid in the first direction in the first space.

22 Claims, 12 Drawing Sheets

(56) References Cited

U.S. PATENT DOCUMENTS

| | | | | |
|---|---|---|---|---|
| 7,703,479 | B2* | 4/2010 | Jacob | B64C 23/005 137/828 |
| 7,735,910 | B2* | 6/2010 | Ramsay | B60J 7/22 180/903 |
| 7,988,101 | B2* | 8/2011 | Osborne | B64C 23/005 244/205 |
| 8,016,247 | B2* | 9/2011 | Schwimley | B64C 23/005 244/200 |
| 8,083,183 | B2* | 12/2011 | Grossein | B64D 33/08 244/130 |
| 8,435,001 | B2* | 5/2013 | Montgomery | F01D 5/145 415/210.1 |
| 8,500,404 | B2* | 8/2013 | Montgomery | F01D 5/186 415/115 |
| 8,523,115 | B2* | 9/2013 | Essenhigh | B64C 23/005 244/205 |
| 9,282,623 | B2* | 3/2016 | Roy | H05H 1/24 |
| 9,709,032 | B2* | 7/2017 | Matsuda | F03D 7/022 |
| 9,820,369 | B2* | 11/2017 | Roy | B64C 23/005 |
| 9,821,862 | B2* | 11/2017 | Han | B62D 35/00 |
| 10,371,050 | B2* | 8/2019 | Iwrey | F02C 7/04 |
| 2008/0122252 | A1 | 5/2008 | Corke et al. | |
| 2008/0290218 | A1* | 11/2008 | Schwimley | B64C 21/00 244/130 |
| 2010/0004799 | A1 | 1/2010 | Drouin, Jr. et al. | |
| 2010/0072777 | A1* | 3/2010 | Ramsay | B62D 35/00 296/180.1 |
| 2010/0224733 | A1* | 9/2010 | Wood | B64C 23/005 244/205 |
| 2019/0193843 | A1* | 6/2019 | Kikuchi | B64C 23/005 |

OTHER PUBLICATIONS

Corke et al. "Sensing and control of flow separation using plasma actuators," Philosophical Transactions of the Royal Society 369(1940), Apr. 13, 2011, 17 pages.

Corke et al. "Single Dielectric Barrier Discharge Plasma Enhanced Aerodynamics. Physics, Modeling and Applications," Review Article, Experiments in Fluids 46(1), Jan. 2009, 44 pages.

Erfani et al. "Development of DBD Plasma Actuators: The double encapsulated electrode," Acta Astronautica, col. 109, Apr.-May 2015, 12 pages.

Hollick et al. "An Investigation into the Sensory Application of DBD Plasma Actuators for Pressure Measurements," Sensors and Actuators A: Physical 171(2) Nov. 2011, 12 pages.

Jolibois et al. "Innovative Three-Electrode Design for Definition of Multiple Dielectric Barrier Discharge Actuators," Proceedings of ESA/IEE-IAS/IE/SFE Joint Conference on Electrostatic, Jun. 2009, 8 pages.

Kozlov. "Plasma Actuators for Bluff Body Flow Control," Prospectus for Dissertation in Partial fulfillment of the requirements for the Degree of Doctor of Philosophy in Aerospace and Mechanical Engineering, University of Notre Dame, May 2007, 95 pages.

Lindvall. "A Glow Discharge Anemometer," Electrical Engineering, 53(7), Jul. 1934, 6 pages.

Lombardi et al. "Closed-Loop Dynamic Stall Control Using a Plasma Actuator," Master's Thesis, in Partial Fulfillment of the Requirements for the Degree of Master of Science in Aerospace Engineering, University of Notre Dame, Apr. 2011, 156 pages.

Luo. "Plasma Based Jet Actuators for Flow Control," PhD Thesis for the degree of Doctor of Philosophy, University of Southhampton, May 2012, 140 pages.

Maths et al. "A.C. Plasma Anemometer for Hypersonic Mach No. Experiments," JANNAF APS-CS-PSHS, Joint Meeting, Dec. 4-8, 2006, 10 pages.

Moreau et al. "Surface Dielectric Barrier Discharge Plasma Actuators," ERCOFTAC Bulletin 94, 2013, 6 pages.

Rethmel et al. "Flow Separation Control over an Airfoil with Nanosecond Pulse Driven DBD Plasma Actuators," 49th AIAA Aerospace Sciences Meeting including the New Horizons Forum and Aerospace Exposition, Jan. 4-7, 2011, 17 pages.

* cited by examiner

METHOD AND APPARATUS FOR COMBINED ANEMOMETER AND PLASMA ACTUATOR

TECHNICAL FIELD

This disclosure generally relates to plasma-based fluid flow actuators and sensors.

BACKGROUND

Structures such as a rectangular building and utility posts typically present significant impediments to surrounding flow of air. Impediments to flow of air can cause various disturbances to the flow such as creation of vortices and turbulence. In general, such structures are classified as bluff bodies.

A bluff body is a body having a shape that, when immersed in a fluid flow, causes separation of the flow over a substantial part of its surface. Such separation of flow typically results in turbulence, and creates a turbulent wake in the downstream region. Aerodynamic forces experienced by a bluff body are typically dominated by pressure drag, or form drag, as opposed to viscous drag which is the dominant force experienced by a streamlined body.

An anemometer is a measuring device for measuring speed and/or direction of gas flow, such as air. Anemometers are commonly used to measure wind speed, for example.

A plasma actuator is a plasma generating device for imparting a net momentum transfer to the surrounding fluid through the generated plasma. The plasma may be generated, for example, through dielectric barrier discharge (DBD), corona discharge, or glow discharge.

SUMMARY

This disclosure features a device that can function both as a sensor for measuring fluid characteristics (e.g., fluid flow direction, fluid flow speed, time dependence of fluid flow) and as a plasma actuator for modifying fluid flow characteristics at the device surface. The device includes three separate electrodes, one of which is exposed to the surrounding fluid. The remaining two electrodes are separated from the surrounding fluid by an insulating layer and laterally spaced apart from opposing sides of the first electrode. The first electrode with the two other electrodes form two pairs of electrodes, both of which are used when the device is operated as a sensor. By generating, for example, a dielectric barrier discharge (DBD), a current flow is established between the two pairs of electrodes across the surrounding fluid. A flow changes the distribution of the plasma, or the charged particles of the plasma, which results in an asymmetric distribution of current flow between the two pairs of electrodes, the difference of which can be used as a measure of the speed and direction of fluid flow.

When operating as a plasma actuator, one of the two pairs of electrodes may be powered, which leads to net momentum transfer to the neutral particles of the surrounding fluid, causing an increase in fluid flow speed. Such increase in fluid flow speed helps mitigate separation of fluid flow from the surface, which can reduce undesired drag on the surface.

Implementations can be used in various applications involving measuring fluid flow and controlling characteristics of such flows. Examples of such applications include drag reduction, controlled modification of turbulence, or other modification of the flow around various moving objects such as cars, trucks, boats, sailboats, airplanes, gliders, various airborne objects, propellers, and rotors. Additional examples include modification of flow around of various objects such as posts, buildings, wind turbine supporting tower, kite tethers, and ropes and lines on sailboats. Further examples includes drag reduction and flow modification at structural surfaces that moves relative to one another, such as a drag or noise reduction of a fan blade of a jet engine near a stator or an engine housing.

In general, in a first aspect, the invention features a method for measuring a fluid flow characteristic of an ambient fluid and modifying fluid flow of the ambient fluid, the method including: applying a first voltage between a first electrode and a second electrode electrically insulated from the first electrode, the first electrode extending in a plane and the second electrode extending along the plane, the first and second electrodes being laterally spaced apart from each other in a first direction in the plane, the ambient fluid at least partially occupying a first space adjacent to the first electrode, wherein the first voltage is sufficient to generate a plasma in the first space; simultaneously to applying the first voltage, applying a second voltage between the first electrode and a third electrode electrically insulated from the first electrode, the third electrode extending along the plane and laterally spaced apart from the first electrode in a second direction in the plane opposite the first direction, the ambient fluid at least partially occupying a second space adjacent to the first electrode and opposite to the first space, wherein the second voltage is sufficient to generate a plasma in the second space; measuring a first current between the first and second electrodes, and a second current between the first and third electrodes; determining a fluid flow characteristic of the ambient fluid based on a difference between the first and second currents; and applying a third voltage between the first and second electrodes, the third voltage being sufficient to generate a plasma in the first space sufficient to modify fluid flow of the ambient fluid in the first direction in the first space.

Embodiments of the method can include one or more of the following features. For example, the first current is at least partly due to a flow of the fluid in the first space and the second current is at least partly due to a flow of the fluid in the second space.

The third voltage can be applied based on the fluid flow characteristic of the ambient fluid determined based on the difference between the first and second currents. The third voltage can be varied based on a time-varying difference between the first and second currents in a feedback or feedforward manner. The third voltage can be supplied sequentially with the first and second voltages.

The fluid flow can be modified to reduce turbulent flow in the first space. The fluid flow can be modified from turbulent flow to laminar flow in the first space by application of the third voltage.

The fluid flow characteristic can be determined by filtering a signal corresponding to the difference between the first and second currents. In some embodiments, the filter is a high-pass filter and a magnitude of a filtered signal corresponds to a magnitude of turbulent flow of the ambient fluid. In some embodiments, the filter is a low-pass filter and a magnitude of a filtered signal corresponds to a laminar flow speed of the ambient fluid.

In some embodiments, the method can further include applying a fourth voltage between the first and third electrodes, the fourth voltage being sufficient to generate a plasma in the second space sufficient to modify fluid flow of the ambient fluid in the second direction in the second space.

In some embodiments, the method can further include generating a plasma sufficient to modify fluid flow of the ambient fluid in a space remote from the first, second, and third electrodes.

In some embodiments, the method can further include applying the third voltage based on a measurement of a fluid flow characteristic of the ambient fluid in a space remote from the first, second, and third electrodes.

In some embodiments, the fluid flow characteristics can include a fluid flow direction, and the applying of the third voltage based on the measurement of the fluid flow characteristic of the ambient fluid in the space remote from the first, second, and third electrodes includes: applying the third voltage based on the measurement of the fluid flow direction of the ambient fluid in a space remote from the first, second, and third electrodes.

In another aspect, the invention features a device for measuring a fluid flow characteristic of an ambient fluid and modifying fluid flow of the ambient fluid, the device including: a first electrode extending in a plane; a second electrode extending along the plane, the second electrode being electrically insulated from the first electrode, the second electrode also being laterally spaced apart from the first electrode in a first direction in the plane, the ambient fluid at least partially occupying a first space adjacent to the first electrode; a third electrode extending along the plane, the third electrode being electrically insulated from the first electrode and the second electrode, the third electrode also being laterally spaced apart from the first electrode in a second direction in the plane opposite to the first direction, the ambient fluid at least partially occupying a second space adjacent to the first electrode and opposite to the first space; a control system electrically connected to the first, second, and third electrodes, the control system being programmed to operate the device in a first mode and a second mode, wherein during operation in the first mode, the control system: applies a first voltage between the first and second electrodes and a second voltage between the first and third electrodes, the first voltage being sufficient to generate a plasma in the first space, and the second voltage being sufficient to generate a plasma in the second space; measures a first current between the first and second electrodes, and a second current between the first and third electrodes; and determines a fluid flow characteristic of the ambient fluid based on a difference between the first and second currents; and wherein during operation in the second mode, the control system: applies a third voltage between the first and second electrodes, the third voltage being sufficient to generate a plasma in the first space sufficient to modify fluid flow of the ambient fluid in the first direction in the first space.

Implementations of the device can include one or more of the following features and/or features of other aspects. For example, during operation in the second mode, the control system can apply a fourth voltage between the first and third electrodes, the fourth voltage being sufficient to generate a plasma in the second space sufficient to modify fluid flow of the ambient fluid in the second direction in the second space.

In some embodiments, the device further includes a layer of a dielectric material extending along the plane, the first electrode being arranged on an opposite side of the dielectric material from the second and third electrodes.

The first and second electrodes can have various geometries. For example, the first and second electrodes can both extend in a third direction in the plane orthogonal to the first and second directions, the first and second electrodes being spaced apart by a constant amount in the first direction along their lengths. As another example, the third electrode can extend in the third direction in the plane, the first and third electrodes being spaced apart by a constant amount in the second direction along their lengths. As yet another example, the first, second, and third electrodes can extend parallel to the third direction. As a further example, the first, second, and third electrodes can extend non-parallel to the third direction.

In some embodiments, the control system includes a power supply and an electronic control module, the power supply being electrically connected to the first, second, and third electrodes and in communication with the electronic control module, the electronic control module being programmed to receive signals corresponding to the first and second currents and to send a signal to the power supply to apply the third voltage.

In some embodiments, the device further includes a substrate supporting the first, second, and third electrodes and an adhesive material on an opposite side of the substrate from the first, second, and third electrodes.

Particular implementations of the subject matter disclosed can be implemented to realize one or more of the following advantages. Integration of a sensor and a plasma actuator into a single device can lead to reduction in weight and footprint. Improvement in feedback control can be achieved due to co-location of the sensor and the plasma actuator. Flow around surfaces of a bluff body can be modified to reduce drag. Wind loading on various structures can be reduced, which can lead to reduced structural requirements. Turbulence can be detected and decreased or increased in real-time through feedback control. Drag mitigation techniques can be adjusted based on measurement of local fluid flow characteristics.

Advantageously, the disclosed system architectures can be used for distributed sensing and actuation over a bluff body, which can improve overall flow modification performance such as drag reduction performance in various conditions.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
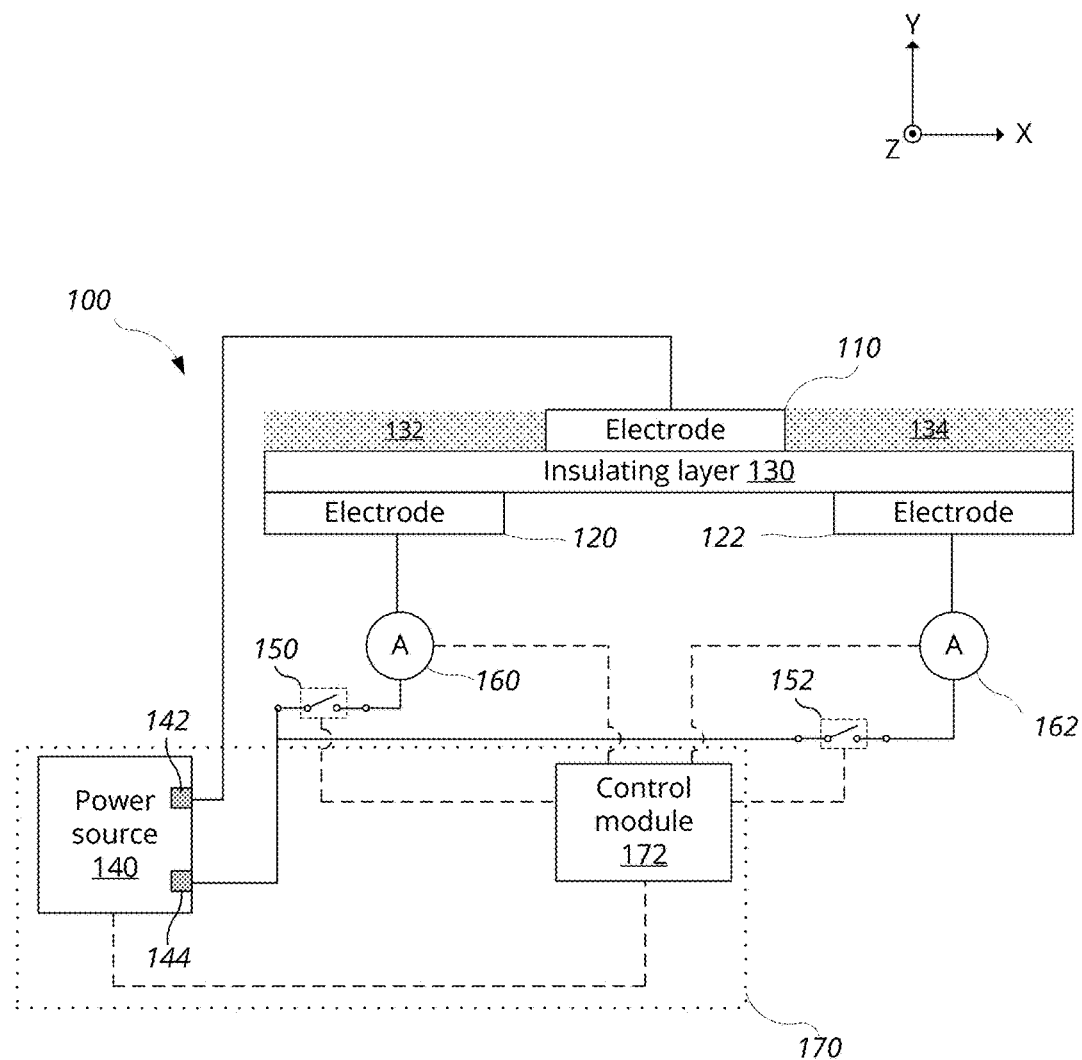
FIG. 1A is a schematic diagram showing an example of a combined plasma sensor-actuator device for measuring a fluid flow characteristic of an ambient fluid and modifying fluid flow of the ambient fluid.

Referring to FIG. 1A, a schematic diagram of an example of a combined plasma sensor-actuator device 100 for measuring a fluid flow characteristic of an ambient fluid and modifying fluid flow of the ambient fluid is shown. The device 100 includes a first electrode 110, a second electrode 120, a third electrode 122, an insulating layer 130, first and second switches 150 and 152, first and second ammeters 160 and 162, and a control system 170. The control system 170 includes a power source 140 and an electronic control module 172.

Cartesian axes are shown for ease of reference, and apply to the structural elements such as the electrodes 110, 120, 122, and the insulating layer 130, but do not apply to non-structural elements such as the switches 150, 152, ammeters 160, 162, and the control system 170. In this regard, the electrodes and the insulating layer are shown in a cross-section. An object's thickness refers to the object's dimension as measured along Y-axis. An object's lateral area refers to the object's area in the X-Z plane. An object's length refers to the object's dimension along the Z-direction. "Top" and "bottom" refer to the +Y and −Y directions, respectively. For example, the top side of the insulating layer 130 refers to the surface facing in the +Y direction, while the bottom surface refers to the opposite surface.

The first electrode 110 extends along a plane (e.g., the X-Z plane), and is arranged on the top side of the insulating layer 130. The first electrode 110 is exposed to an ambient fluid, which may be various gases or mixture thereof, such as air. The second and third electrodes 120 and 122 are arranged on the bottom side of the insulating layer 130, opposite to the first electrode 110. Electrodes 120 and 122 are not exposed to the ambient fluid, being insulated both electrically from the first electrode 110 and physically from the ambient fluid by the insulating layer 130.

The second electrode 120 is laterally spaced apart in a first direction in the plane of the first electrode 110 (e.g., in the −X direction), and the third electrode 122 is laterally spaced apart in a second direction in the plane of the first electrode 110 (e.g., in the +X direction). The lateral separation in the first direction between the first electrode 110 and the second electrode 120 may be constant along the lengths of the two electrodes, and similarly, the lateral separation in the second direction between the first electrode 110 and the third electrode 122 may be constant along the lengths of the two electrodes. Generally, the electrodes are in sufficient spatial proximity such that the plasma generated between the first and second electrodes 110 and 120 is exposed to substantially the same fluid flow as the plasma generated between the first and third electrodes 110 and 122. For example, the lateral separations between the first and second electrodes 110 and 120 and between the first and third electrodes 110 and 122 can be on the order of millimeters to centimeters (e.g., 1 mm, 2 mm, 3 mm, 5 mm, 10 mm, 20 mm).

Electrodes 110, 120, and 122 each extend in the Z direction. For example, each of the electrodes can be formed in a shape of a strip, each extending in a straight line parallel to the +Z direction. Such electrode strips can have a constant lateral separation along their lengths.

As the first electrode 110 and the top surface of the insulating layer 130 is exposed to the ambient fluid, the ambient fluid occupies a first space 132 between the first and the second electrodes (e.g., a region above the insulating layer 130 adjacent to the first electrode 110 and facing the second electrode 120), and a second space 134 between the first and third electrodes (e.g., a region above the insulating 130 adjacent to the first electrode 110 and facing the third electrode 122).

While the second electrode 120 and the third electrode 122 have been assigned a specific orientation relative to the first electrode 110 (e.g., −X direction for the second electrode 120 and +X direction for the third electrode 122), such assignments are only to facilitate description of the device and its operation, and the assignments of the second and third electrodes 120 and 122 may be swapped interchangeably without affecting operation of the device 100.

In general, the electrodes 110, 120, and 122 may be formed using various electrically conducting materials. As the electrodes may be exposed to high voltage, high current, plasma, or combination thereof, electrodes are preferably be formed from materials having high electrical conductivity, resistance to corrosion, and/or high durability in a plasma environment. For example, the electrodes may be formed using certain metal foils, such as copper foils. The thickness of such foils may range from 10 µm to 100 µm.

The insulating layer 130 extends along the plane of the first electrode 110, and may be provided by various materials. The insulating layer is preferably formed using a material that is mechanically durable and resistant to dielectric breakdown (i.e., has a high dielectric breakdown voltage). Examples of such materials include polyimides (e.g., Kapton®), Polytetrafluoroethylenes (PTFE) (e.g., Teflon), ceramic materials (e.g., Macor®), glass, and various other dielectric materials such as Quartz, $SiO_2$, $Si_3N_4$, SiON, plastic, and rubber.

The power source 140 has a first terminal 142 and a second terminal 144, and generates a voltage across the two terminals. The first terminal 142 is electrically connected to the first electrode 110, and the second terminal 144 is electrically connected to the second and third electrodes 120 and 122. The power source 140 is configured to provide a driving voltage sufficient for generating a plasma in the first space 132, the second space 134, or both. The driving voltage can range from hundreds of V to tens of kV depending on various factors such as the type and pressure of the ambient fluid, and geometry of the device 100 such as the vertical and lateral separations between the first electrode 110 and the second and third electrodes 120 and 122, and lengths (e.g., in the Z-direction) and widths (e.g., in the X-direction) of the electrodes 110, 120, and 122. Other factors may include the frequency of the driving voltage, material of the electrodes, material of the insulating layer 130, and operation mode of the device 100. Additionally, to improve power transfer efficiency and/or reduce potentially damaging signal reflection from the electrodes, the power source 140 may include a matching network to perform impedance matching.

The power source 140 may be configured to generate various types of waveforms. Examples of waveforms include sinusoid, saw-tooth and square wave. Frequency of such waveforms may range from hundreds of Hz to hundreds of kHz, and may be chosen based on various factors such as the type and pressure of the ambient fluid, and the geometry of the device 100 such as vertical and lateral separations between the first electrode 110 and the second and third electrodes 120 and 122, and lengths (e.g., in the Z-direction) and widths (e.g., in the X-direction) of the electrodes 110, 120, and 122.

The power source 140 may be configured to generate pulses of voltage. For example, the duration of the pulse may range from 1 ns to hundreds of ns, and peak voltages may range from 10 to 100 kV. For such pulsed power sources, the pulse duration and the repetition frequency may be modified in addition to the value of the third voltage to change the fluid flow modification achieved by the device 100. In general, increasing the pulse duration while keeping the repetition frequency the same (i.e., increasing the duty cycle of the pulses) can increase the degree of fluid flow modification achieved by the device 100, and vice versa.

The electronic control module 172 is in communication with the power supply 140, the switches 150 and 152, and the ammeters 160 and 162. The control module 172 is configured to receive a reading of a first current from the first ammeter 160 and a reading of a second current from the second ammeter 162. The control module 172 is additionally configured to send a signal to the power supply 140 to change various characteristics of the voltage generated by the power supply 140. Furthermore, the control module 172 is configured to send a signal to the switches 150 and 152 to open or close the switches. Communication between the control module 172, the ammeters 160 and 162, and the power supply 140 may be conducted through wired connections, wireless channels, or combination thereof. The control module 172 together with the power source 140 forms the control system 170 for controlling the combined plasma sensor-actuator device 100. The control system 170 has at least two operation modes.

Figure 1B:
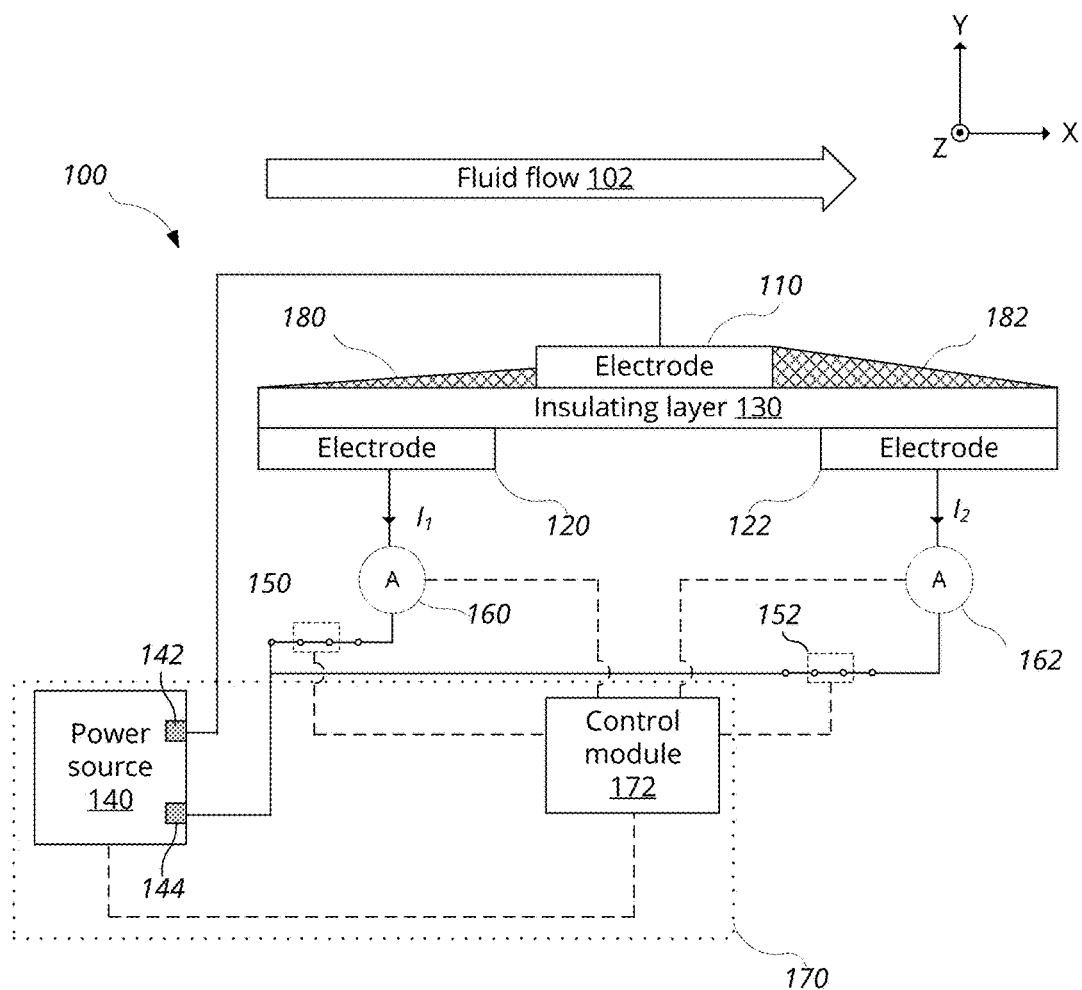
FIG. 1B shows the device of FIG. 1A configured to operate in a first mode to measure the fluid flow characteristic of the ambient fluid.

Referring to FIG. 1B, the device 100 of FIG. 1A configured to operate in a first mode to measure the fluid flow characteristic of the ambient fluid is shown. The device 100 operating in the first mode, or sensing mode, may measure various fluid flow characteristics. Examples of fluid flow characteristic of the ambient fluid that may be measured by the device 100 include flow direction, flow speed, and spectral characteristics of the flow speed.

When operating in the sensing mode, the control system 170 may simultaneously apply a first voltage between the first and second electrodes 110 and 120, and a second voltage between the first and third electrodes 110 and 122. The first voltage is sufficient to generate a first plasma region 180 in the first space 132 adjacent to the first electrode and opposite the insulating layer from the second electrode, and the second voltage is sufficient to generate a second plasma region 182 in the second space 134 adjacent to the first electrode and opposite the insulating layer from the third electrode. The first and second voltages may be equal, e.g., power source 140 drives both pairs of electrodes. In this example, this is achieved by closing both of the switches 150 and 152.

Plasma is a state of matter in which gaseous species are ionized, resulting in a mixture of negatively charged electrons, positively charged ions, and neutral particles. In response to the voltages applied across the electrodes, the negatively and positively charged particles may conduct a current across the space between the electrodes. The amount of current flow across the space may correspond to the quantity and/or distribution of plasma within the space. When driven with an AC voltage, the current may flow across the space without charge accumulation at the interface between the ambient fluid and the insulating layer 130.

The control system 170 measures a first current $I_1$ between the first and second electrodes 110 and 120, and a second current $I_2$ between the first and third electrodes 110 and 122. In absence of fluid flow across the device 100 (e.g., no wind), the plasma may be distributed evenly across the plasma regions 180 and 182. Accordingly, difference between the first and second currents may be sufficiently small to be negligible (e.g., less than 1, 10, 50, 100, 250, or 500 μA). To minimize the difference between the first and second currents in absence of fluid flow, it may be preferable to arrange the second and third electrodes 120 and 122 to be symmetric about the first electrode 110.

Now, in presence of a fluid flow 102 over the surface of the device 100, the distribution of plasma between the plasma regions 180 and 182 may be modified. For example, the flow 102 may be wind blowing in the +X direction, blowing in a direction from the second electrode 120 to the third electrode 122. Such flow 102 may shift a portion of the plasma in the first plasma region 180 in the downstream direction, increasing the plasma in the second plasma region 182 over the third electrode 122 and decreasing the plasma in the first plasma region 180 over the second electrode 120. In response to such redistribution of plasma, the second current $I_2$ may increase relative to the first current $I_1$.

The control system 170 may determine a fluid flow characteristic of the ambient fluid based on a difference between the first and second currents $I_1$ and $I_2$. For example, defining the difference between the first and second currents as $\Delta I = I_1 - I_2$, the sign of the difference may be indicative of the direction of the fluid flow. In this example, flow 102 causes the second current $I_2$ to be greater than the first current $I_1$, resulting in a negative sign for the difference. As such, flow in the +X direction may be indicated by a negative $\Delta I$, and flow in the −X direction may be indicated by a positive $\Delta I$.

The magnitude of the difference $\Delta I$ of the first and second currents may be indicative of the speed of the fluid flow 102. As the speed of the flow 102 increases, plasma may be increasingly shifted toward the second plasma region 182, further increasing $I_2$ and further decreasing $I_1$, resulting in an increase in the magnitude of $\Delta I$.

A time series of the difference $\Delta I$ of the first and second currents may be indicative of spectral characteristics of the flow 102. For example, for a constant fluid flow 102, the difference $\Delta I$ may be constant in time within noise of the device 100. Factors that contribute to noise of the device 100 may include noise of the ammeters 160 and 162, fluctuations of the power source 140, and stability of the plasma generated by the device 100. As another example, for a time varying fluid flow 102, the difference $\Delta I$ may track the variation of the flow 102 in both sign and magnitude. The bandwidth of the device 100 in measuring $\Delta I$ may be affected by various factors such as mobility of the ionized species and local electric field strength.

In some implementations, the first and second voltages may be different. For example, a difference in the first and second voltages may be used to compensate for any asymmetry in the first and second currents $I_1$ and $I_2$ in absence of fluid flow to "zero" the measurement of the device 100. As another example, the device 100 may be operated in a constant-current mode, in which the control system 170 controls the first and second voltages in a feedback loop to maintain the first current $I_1$ and the second current $I_2$ at a fixed value. In the constant-current mode operation, the difference between the first and second voltages may be used to determine the fluid flow characteristic of the ambient fluid.

Application of the first and second voltages that are different from each other may be achieved in various ways. For example, the electrodes 110 and 120 can be driven with a first power source, and the electrodes 110 and 122 can be driven with a second power source. First terminals of the first and second power sources may be electrically connected to the first electrode 110, and second terminals of the first and second power sources may be electrically connected to the second and third electrodes 120 and 122, respectively. Alternatively, an attenuating element may be placed in the electrical connection between the second or third electrodes and the second terminal 144 to change the voltage established between the first electrode and the second or the third electrode.

Figure 1C:
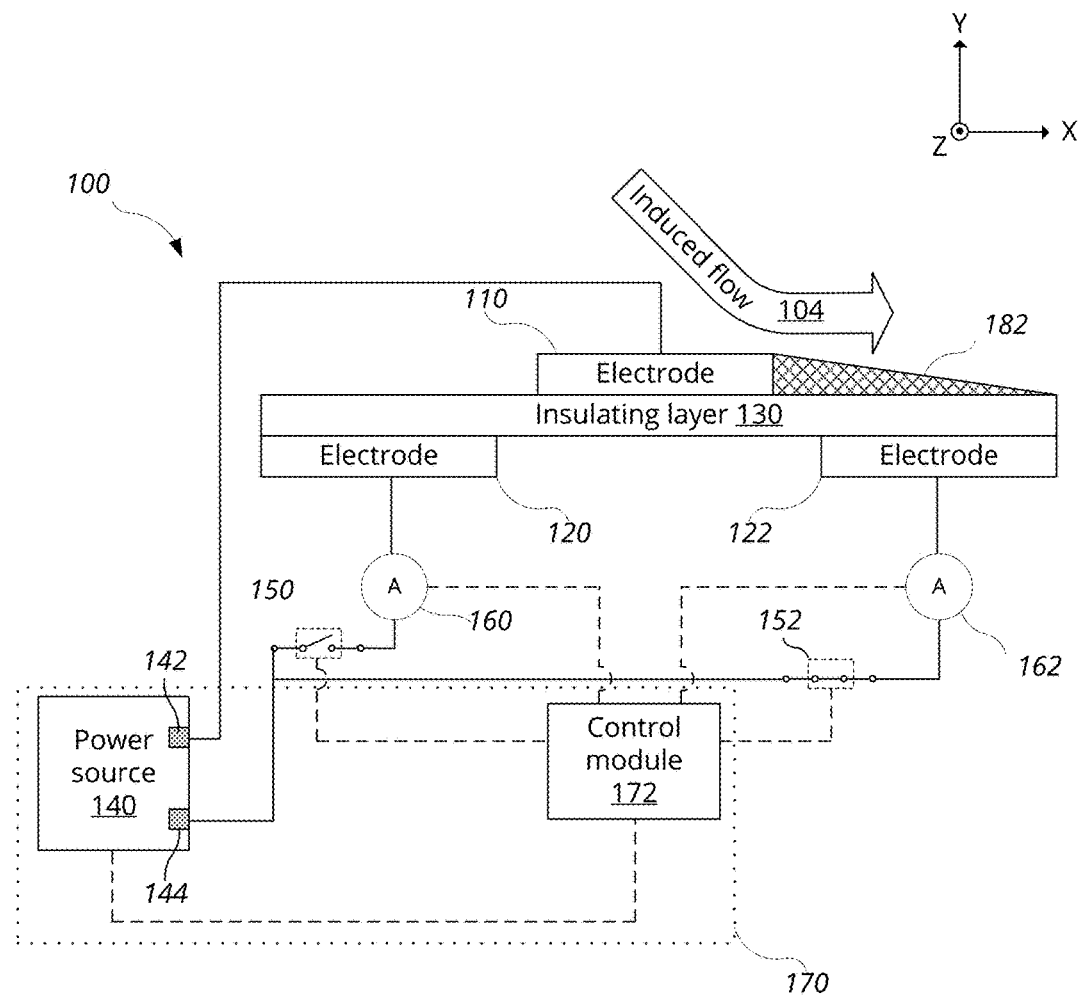
FIG. 1C shows the device of FIG. 1A configured to operate in a second mode to modify fluid flow of the ambient fluid.

Now referring to FIG. 1C, the device 100 of FIG. 1A configured to operate in a second mode to modify fluid flow of the ambient fluid is shown. When operating in the second mode, or the actuation mode, the control system 170 applies a third voltage between the first and second electrodes 110 and 120, or between the first and third electrodes 110 and 122. The third voltage is sufficient to generate a plasma in the first or second plasma regions 180 or 182, and is also sufficient to modify fluid flow of the ambient fluid. The third voltage is typically greater than the first and second voltages. The device 100 operating in the second mode may be referred to as "actuating".

In this example, the third voltage is applied between the first electrode 110 and the third electrode 122 by opening the first switch 150 and closing the second switch 152. This leads to generation of plasma in the second plasma region 182, which may modify the fluid flow of the ambient fluid in the second space 134 between the first and third electrodes 110 and 122 in the second direction (e.g., +X direction). The charged particles of the plasma generated in the second plasma region 182 are accelerated by the third voltage applied across the first and third electrodes. Such acceleration of the charged particles leads to collision with the neutral particles in the ambient fluid, leading to a net momentum transfer.

Net momentum transfer causes an acceleration of the fluid flow at and/or near the second plasma region 182. Such increase in fluid flow speed may help mitigate separation of fluid flow from the surface, which can in turn reduce drag on the surface. Furthermore, the increase in fluid flow speed generated by the plasma may generate an induced flow 104. In this example, the induced flow 104 may flow in the general direction from the first electrode 110 to the third electrode 122 (e.g., in the +X direction.

Degree of fluid flow modification may generally be controlled by the magnitude, the duty cycle, and/or waveform of the third voltage. For example, the speed of the induced flow 104 may increase with increasing third voltage. Additionally, the degree of modification may exhibit an asymptotic behavior with increasing third voltage, resulting in reduced change in the degrees of modification at high values of the third voltage.

In some implementations, a fourth voltage may be applied between the first electrode 110 and the second electrode 120 or between the first and third electrodes 110 and 122 while the third voltage is being applied, such that both pairs of electrodes are simultaneously driven. Similar to the third voltage, the fourth voltage is sufficient to generate a plasma in the first or second plasma regions 180 or 182, and is also sufficient to modify fluid flow of the ambient fluid. The fourth voltage is typically greater than the first and second voltages. During simultaneous application of the third and fourth voltages to both pairs of the electrodes, induced flows may be generated in both the +X direction and the −X direction.

While the first electrode 110 is illustrated as being placed on top of the insulating layer 130, the first electrode 110 can be partially embedded in the insulating layer 130 such that only a portion of the first electrode 110 (e.g., a top surface) is exposed to the ambient fluid. Similarly, the second and third electrodes 120 and 122 may be partially or fully embedded in the insulating layer 130.

While the device 100 as shown includes the insulating layer 130, the insulating layer 130 may be removed in some implementations. In such implementations, the three electrodes are immersed in a common ambient fluid, and plasma may be generated using a DC driving voltage without adverse charge accumulation at the insulating layer 130, which may allow operation of the device 100 with a DC driving voltage, or with a driving voltage having a lower frequency than may otherwise be feasible in presence of the insulating layer 130.

While the first electrode 110 is illustrated as being placed on top of the insulating layer 130 and exposed to the ambient fluid and the second and third electrodes 120 and 122 are illustrated as being placed below the insulating layer 130 and not exposed to the ambient fluid, the arrangement can be mirrored in some implementations. In such implementations, the second and third electrodes 120 and 122 are exposed to the ambient fluid, and the first electrode 110 is not exposed to the ambient fluid. Such implementation may operate in a manner analogous to the operation of the device 100.

While the voltage output by the single power source 140 is routed to the electrodes using the switches 150 and 152 to drive the electrodes in the illustrated example, in general, the first and second electrodes 110 and 120 can be driven with a first power source, and the first and third electrodes 110 and 122 can be driven with a second power source. First terminals of the first and second power sources may be electrically connected to the first electrode 110, and second terminals of the first and second power sources may be electrically connected to the second and third electrodes 120 and 122, respectively. The first and second power sources can be controlled by the electronic control module 172 to independently vary various parameters of the driving voltage for each pair of electrodes.

The electronic control module 172 may be additionally configured to receive various types of sensor inputs from various sources. For example, in cases where the device 100 is installed on an aircraft, the device 100 can experience a wide range of air qualities, varying from the sea level to cruising altitudes (e.g., 30,000 feet). In such cases, additional sensor inputs such as temperature, humidity, and density inputs can be used for various purposes such as calibrating a sensing transfer function of the device 100 and adapting various actuation parameters of the device 100 to the operating environment and conditions. Furthermore, the electronic control module 172 may accept a manual input from an operator (e.g., pilot of the airplane) to vary operation of the device 100.

Figure 2:
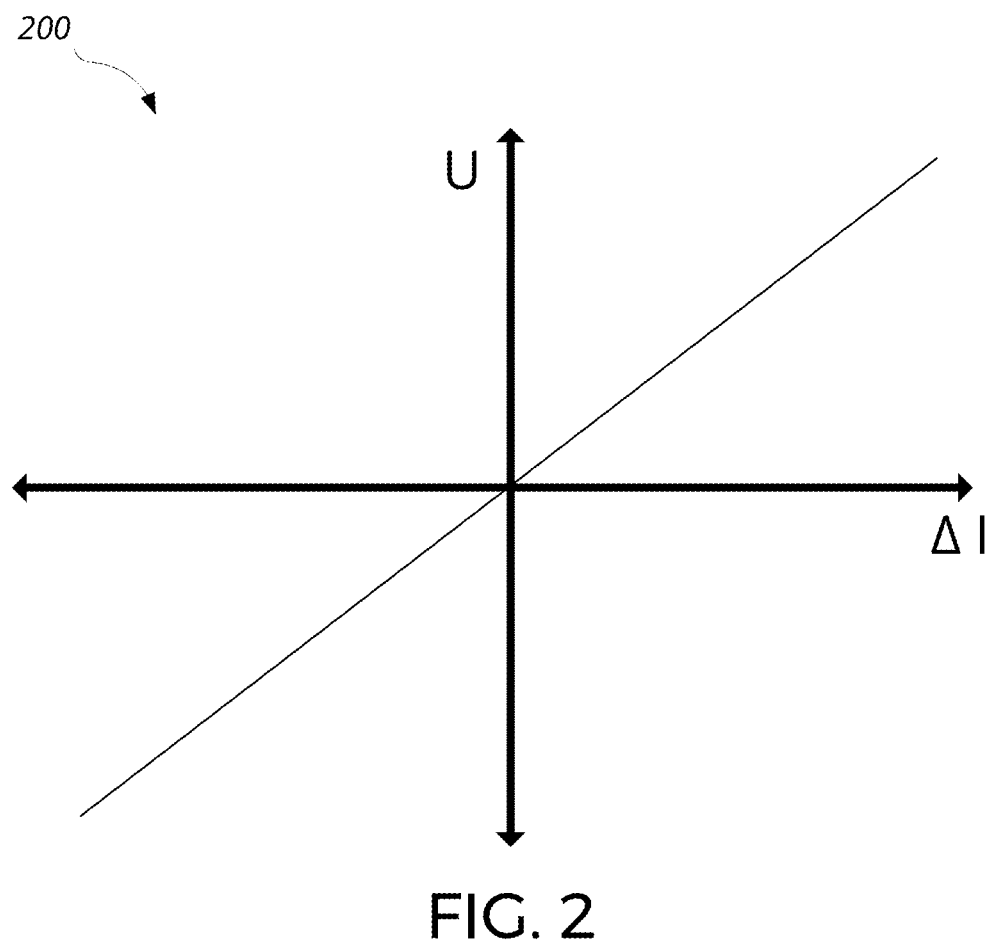
FIG. 2 depicts an example of a transfer function of the combined plasma sensor-actuator device operating in the first mode.

Referring to FIG. 2, an example of a transfer function 200 of the combined plasma sensor-actuator device 100 operating in the first mode is depicted. The X-axis corresponds to the difference between the first and second currents $I_1$ and $I_2$ ($\Delta I$), and the Y-axis corresponds to the flow speed (U), where the sign of the flow speed U indicates whether the fluid is flowing towards or away from the device 100. For example, referring back to FIG. 1B, the fluid flow 102 flowing in the +X direction may correspond to a positive flow speed U, and vice versa. In the example shown, the relationship between $\Delta I$ and U is linear, in which a change in $\Delta I$ is directly proportional to a change in U.

In general, the transfer function 200 may have various shapes that may be determined empirically. For example, using a wind tunnel, a calibrated and controlled series of fluid flow 102 at different flow speeds can be applied to the device 100. By measuring $\Delta I$ at each of the flow speeds, the transfer function 200 can be determined. Such empirically determined transfer function 200 may be described by various mathematical functions and series. For example, portions of the transfer function 200 may be adequately described by a polynomial series (e.g., Taylor series). Mathematical fitting procedures can be used to generate an approximate mathematical representation, which can then be used by the control module 172 to determine the flow speed U for a given $\Delta I$.

In general, the device 100 can operate in various types of ambient fluid at various conditions. The ambient fluid may be various gases (e.g., Nitrogen, Oxygen, Argon) or mixture thereof, such as air. The transfer function 200 may change based on the composition of the ambient fluid. The transfer function 200 may also change based on pressure, temperature, and/or density of the ambient fluid. Such variations can be measured and calibrated such that during operation of the device 100, the transfer function 200 is modified based on ambient fluid characteristics to provide an accurate measurement of the fluid flow characteristics.

Based on a time-series of flow speed U measured by the device 100 operating in the sensing mode, various fluid flow characteristics can be determined. Examples of such characteristics include laminar flow speed, presence of turbulent flow, and degree of turbulence. The fluid flow characteristic can be determined, for example, by filtering a signal corresponding to the difference between the first and second currents (e.g., $\Delta I$). The filtering of the signal corresponding to $\Delta I$ can achieve various effects such as noise reduction, extraction of the laminar flow speed, and extraction of a turbulence indicator signal. For example, by filtering the signal using a low-pass filter with an appropriate high frequency cut-off (e.g., 1, 5, 10, 20, 50, 100 Hz), the fast-varying component (e.g., rapid variation in flow speed due to turbulence) can be filtered out, resulting in a filtered signal in which its magnitude corresponds to an average speed, or laminar flow speed, of the ambient fluid.

As another example, by filtering the signal using a high-pass filter with an appropriate low frequency cut-off (e.g., 1, 5, 10, 20, 50, 100 Hz), a slowly varying component (e.g., laminar flow speed) can be filtered out, resulting in a filtered signal representative of the turbulent portion of the flow, in which its magnitude corresponds to a magnitude of turbulent flow of the ambient fluid. Such a filtered signal may be used as a turbulence indicator signal for feedback operation.

The device 100 can be operated in various manners to modify fluid flow of the ambient fluid in a desirable manner. In some implementations, the third voltage can be applied based on the fluid flow characteristic of the ambient fluid determined based on the difference between the first and second currents (e.g., $\Delta I$). For example, based on the direction of the fluid flow determined from the sign of $\Delta I$, the third voltage can either be applied between the first electrode 110 and the second electrode 120 or between the first electrode 110 and the third electrode 122. As another example, when the measured speed U is above a predetermined threshold, the third voltage can be applied. The predetermined threshold may be set, for example, as a fluid speed below which only a negligible turbulence or wind loading is generated on a structure on which the device 100 is attached. Such a fluid speed may be determined based on fluid dynamics simulations or by empirical observations. By selectively applying the third voltage when non-negligible turbulence or wind loading is generated, electrical power can be more efficiently used.

In some implementations, the third voltage can be varied based on a time-varying difference between the first and second currents in a feedback or feedforward manner. For example, in a feed-forward operation, the third voltage can vary in proportion to the measured fluid speed U. When the speed U increases, based on knowledge of the aerodynamic behavior of the structure on which the device 100 is attached, the third voltage can be increased accordingly to attempt to keep the fluid flow attached to the surface of the device 100, and vice versa when the speed U decreases.

Figure 3:
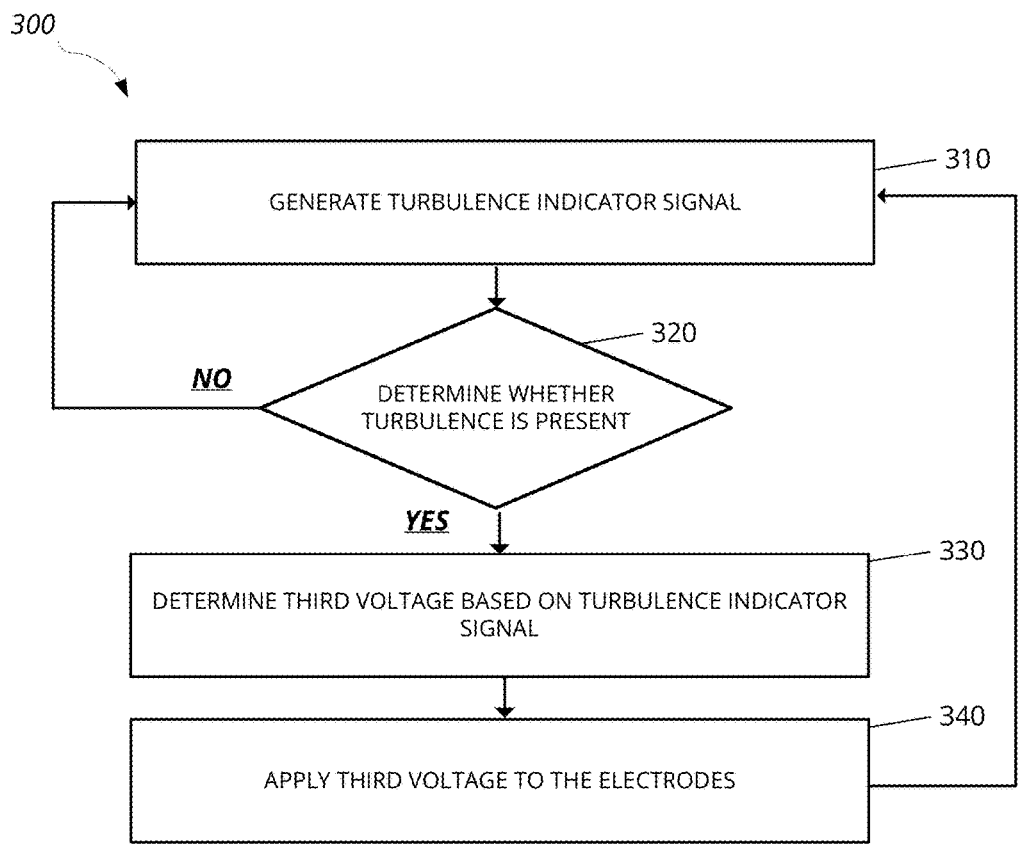
FIG. 3 shows a flowchart of an example process for feedback operation of the combined plasma sensor-actuator device.

The device 100 can be operated in various feedback operation modes. Referring to FIG. 3, a flowchart of an example process 300 for feedback operation of the combined plasma sensor-actuator device 100 is shown. Initially, at 310, the control system 170 generates a turbulence indicator signal. For example, the turbulence indicator signal can be generated by filtering the signal using a high-pass filter with an appropriate low frequency cut-off as previously described. Other examples of the turbulence indicator signal include a root-mean-square (RMS) value of $\Delta I$, a power spectral density (PSD) of $\Delta I$ at a certain frequency, and a frequency corresponding to a dominant spectral content of $\Delta I$.

At 320, the control system 170 determines whether turbulence is present. For example, the determination can be based on whether instantaneous magnitude of the turbulence indicator signal is greater than a threshold. In some implementations, the determination can be based on an integration of the turbulence indicator signal over a period of time. Due to the fluctuating, noise-like characteristic of the turbulence indicator signal, integrating the magnitude, or the absolute value, of the turbulence indicator signal may provide a value that better indicates the degree of turbulence in a given period of time. If the control system 170 determines that turbulence is not present (e.g., instantaneous or integrated value of the turbulence indicator signal is at or below the threshold), the control system 170 returns to step 310. If the control system 170 determines that turbulence is present (e.g., instantaneous or integrated value of the turbulence indicator signal is above the threshold), the control system 170 proceeds to step 330.

The threshold can be static or dynamic. For example, the threshold can be predetermined based on factors such as the structure on which the device 100 is attached, the location of the device 100 on the structure, or desired degree of turbulence modification. Alternatively, the threshold can be dynamically set based on various factors. For example, the threshold can be set based on an acceptable amount of turbulence. As another example, the threshold can be set based on the speed of a vehicle on which that the device 100 is attached. As yet another example, for stationary objects such as buildings or wind turbine towers, the threshold can be set based on a prevailing wind speed. As a further example, the threshold can be set based on the orientation of the device relative to the fluid flow direction.

At 330, the control system 170 determines the third voltage based on the turbulence indicator signal. For example, the third voltage can be varied in proportion to the magnitude of the turbulence indicator signal. As another example, for pulsed power source 140, the pulse duration and/or frequency of the pulsed third voltage can be varied based on the turbulence indicator signal. As yet another example, the third voltage can be a set value that does not vary depending on the turbulence indicator signal. In such cases, the device 100 effectively operates in a binary on-off manner.

At 340, the control system 170 applies the third voltage to the electrodes. For example, the control system 170 can apply the determined third voltage across the first and second electrodes 110 and 120, or across the first and third electrodes 110 and 122 to cause modification of fluid flow. A duration of this application of the third voltage can be based on various factors. For example, it would be desirable to apply the third voltage over sufficient period of time such that a measurable change in fluid flow and/or turbulence takes place. Time scale of such changes may depend on factors such as the fluid flow speed U or characteristics of the structure on which the device 100 is attached.

After the third voltage has been applied for a period of time, the control system 170 returns to step 310 to continue feedback operation of the device 100.

In some implementations, the fluid flow is modified by the device 100 to reduce turbulent flow in the first space 132 between the first and second electrodes. For example, by operating the device 100 in a feedback manner as described above, the turbulent flow may be reduced. In some cases, the turbulence can be reduced to the point that the fluid flow is modified from turbulent flow to laminar flow in the first space 132 between the first and second electrodes by application of the third voltage.

Near real-time sensing of the fluid flow characteristic and modification of the fluid flow may be advantageous for controlling the fluid flow based on the measured fluid flow characteristics. Such near real-time operation may be achieved in various ways. For example, the device 100 can be operated in the first mode followed by the second mode in rapid succession by sequentially applying the third voltage with the first and second voltages. When operating in the first mode, the first and second voltages are applied to the electrodes. Once acquisition of the fluid flow characteristics is complete, or when modification of fluid flow is desired, the device 100 may then switch to operating in the second mode by applying the third voltage between the first and second electrodes 110 and 120 or the first and third electrodes 110 and 122. Once the fluid modification is completed, or to assess the effect of the applied flow modification to the fluid flow characteristics, the device 100 may switch back to the first mode. This cycle can be repeated to achieve near real-time sensing and modification.

In some implementations, the first or the second voltage may continue to be applied while the third voltage is applied in the second mode. For example, the first and second voltages smaller than the third voltage may be applied during operation in the first mode. Then, either the first or second voltage may be increased to the third voltage to operate in the second mode, then reduced back to the original level to return to the sensing mode. In such operation, a phase-sensitive detection scheme can be used such that the effect of applying the third voltage (e.g., increase in one of the currents) is not reflected in the resulting measurement of the fluid flow characteristics. Alternatively, or additionally, a separate signal may be applied in addition to the third voltage, which can be used for sensing.

While various examples of operating the device 100 to reduce turbulence and/or drag have been described, in some implementations, the device 100 can be operated to create turbulence and/or drag for situations where a certain amount of turbulence or drag is desired. For example, in some cases, increase in turbulence may lead to an increase in drag and vice versa, while in other some cases, increase in turbulence may lead to a decrease in drag and vice versa. To account for such variations, in general, a magnitude of turbulence can be controlled to a desired magnitude by operating the device 100 in feedback operation. In such scenarios, the step 320 of process 300 can be generalized to determine whether a desired magnitude of turbulence is present. Such determination can be based on a determination that the turbulence indicator signal is within a predetermined range around a set point. For example, when turbulence is to be minimized, the set point can be set close to 0, such that when turbulence is not within the predetermined range from 0, the third voltage can be set to reduce the turbulence. As another example, when the turbulence is to be set to a desired magnitude, the set point can be set to a value corresponding to the desired magnitude of turbulence, such that when turbulence is not within the predetermined range from the set point, the third voltage can be set to decrease or increase the turbulence to achieve the desired magnitude of turbulence.

In some implementations, the fourth voltage may be applied in addition to the third voltage to aid in achieving the set point for the turbulence. For example, simultaneous application of the third and the fourth voltage can generate both co-propagating and counter-propagating induced flows, which may lead to an increase in turbulence.

So far, structure and operation of a single sensor-actuator device 100 have been described. Now, arrangement and operation of two or more devices 100 exposed to a common ambient fluid will be described. The electrodes of the two or more devices may be connected to a common control system. The common control system may perform operate one device in the sensing mode, and operate another device in the actuation mode based on the sensed fluid flow characteristics.

Figure 4A:
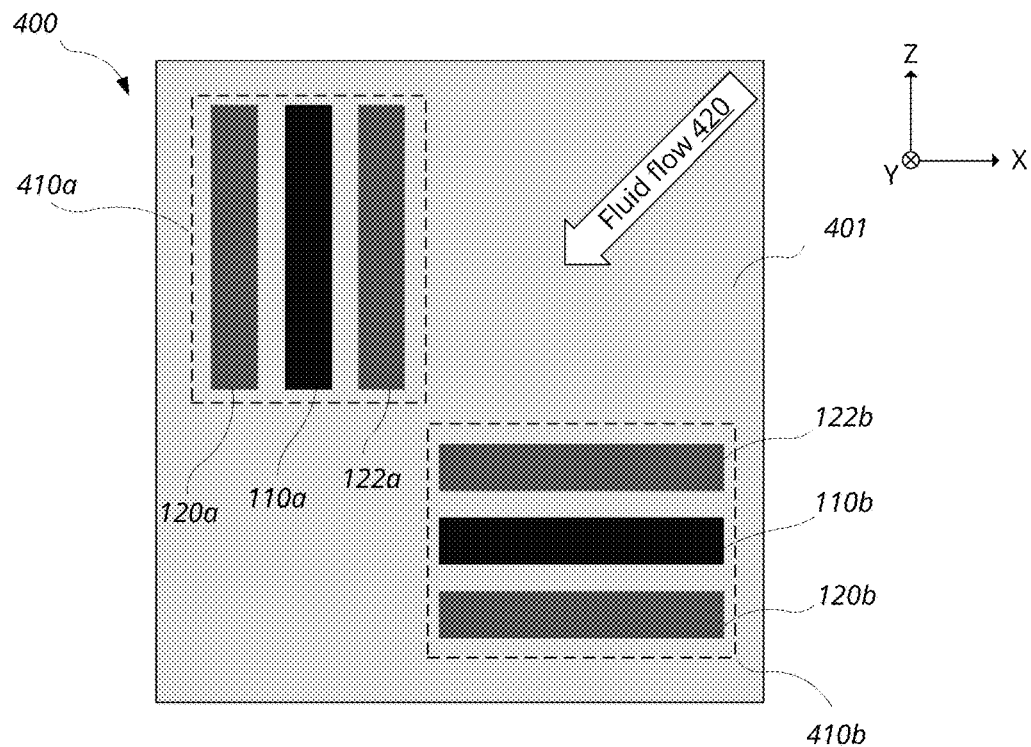
FIG. 4A shows a schematic of an orthogonal arrangement of the combined plasma sensor-actuator devices for sensing and actuation along two orthogonal axes.

Referring to FIG. 4A, a schematic of an orthogonal arrangement 400 of combined plasma sensor-actuator devices for sensing and actuation along two orthogonal axes is shown. The orthogonal arrangement 400 includes first and second combined plasma sensor-actuator devices 410a and 410b (collectively 410) arranged on a surface 401. The devices 410a and 410b are similar to the device 100 previously described except as described. In this example, the electrodes 110a, 120a, and 122a of the first device 410a are strips parallel to the Z-axis, and the electrodes 110b, 120b, and 122b of the second device 410b are strips parallel to the X-axis. As a result, the first and second devices 410a and 410b are orthogonal to each other.

Due to the linear arrangement of the electrodes, each of the devices 410 may only be able to sense and actuate in a direction perpendicular to a length direction of the electrodes. For example, the first device 410a may only be able to accurately measure fluid flow characteristics along the X-direction, and the accuracy of the measurement may decrease as the fluid flow deviates from the X-direction. In the asymptotic case where the fluid flow is completely in the Z-direction, the first device 410a may have small to no response to such a fluid flow. In other words, the first device 410a may measure the X component of the fluid flow characteristics (e.g., X-component of the fluid flow velocity vector).

By arranging the second device 410b to be perpendicular to the orientation of the first device 410a, the second device 410b can measure an orthogonal component (e.g., Z-component) of the fluid flow characteristics that may not be measured by the first device 410a. Therefore, by combining the measurements from the first and second devices 410a and 410b, the vector nature of a fluid flow 420 that is not aligned to the axes of the devices 410 may be accurately measured.

Similarly, the devices 410 may only be able to modify the fluid flow in the direction perpendicular to the length direction of the electrodes. By arranging the devices 410 in an orthogonal orientation, an induced flow can be generated along any directions of the surface 401.

Various factors may affect the relative placement of the devices 410. For example, the devices can be spatially offset along the surface 401 to reduce cross-talk to one another. One example of spatial offsets is a diagonal offset shown in FIG. 4A, which may be beneficial for maintaining spatial proximity while reducing potential for cross-talk. In such a configuration, an induced flow generated by the first or second device is not directly aimed at the other device. Other examples of offset include separating the two devices sufficiently far enough such that plasma and/or induced flow generated by one device does not affect the other device.

In general, the orthogonal arrangement 400 of the devices 410 may be grouped as a standard unit of deployment to enable operation along any direction of the surface 401. In some implementations, the pair of devices 410a and 410b may be integrally formed to implement a single 2-axis sensor-actuator device. For example, the pair of devices 410a and 410b can be on a common substrate.

Figure 4B:
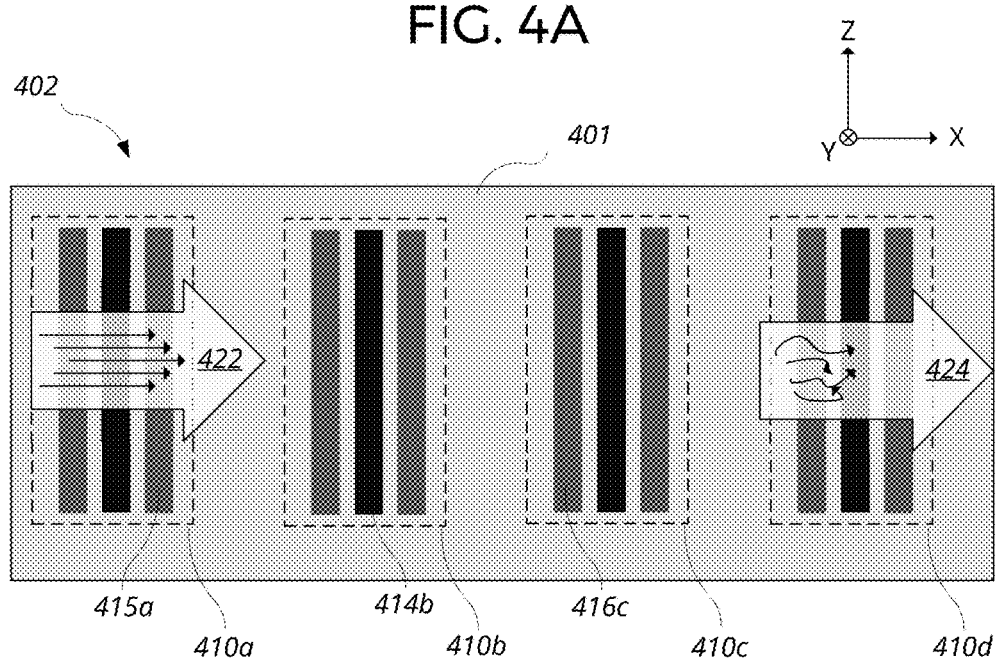
FIG. 4B shows a schematic of a linear arrangement of the combined plasma sensor-actuator devices for measuring fluid flow characteristics and actuating along a long bluff body.

Referring to FIG. 4B, a schematic of a linear arrangement 402 of the combined plasma sensor-actuator devices for measuring fluid flow characteristics and actuating along a long bluff body is shown.

The linear arrangement 402 includes first through fourth combined plasma sensor-actuator devices 410a through 410d (collectively 410) linearly arranged on a surface 401. The devices 410a through 410d are similar to the device 100 previously described except as described. In this example, the electrodes of the devices 410 are all aligned along the same direction (e.g., the Z-direction), and the devices 410 are aligned in a line parallel to the X-axis.

In some scenarios, plasma can be generated at a device 410 to modify fluid flow of the ambient fluid in a space remote from the first, second, and third electrodes of the device 410. For example, a laminar flow 422 may be flowing at the location of the first device 410a. However, as the laminar flow 422 flows in the +X direction over the surface 401, the laminar flow 422 may separate from the surface 401 and turn into a turbulent flow 424 when the flow reaches the location of the fourth device 410d. Such separation of flow resulting in a turbulent flow at a downstream location may be mitigated by modifying the fluid flow at an upwind location that is remote from the location of the turbulent flow. For example, by actuating the first device 410a to modify the fluid flow at the first space 132 above the first device 410a (e.g., accelerate flow speed), the flow may stay attached to the surface 401 over a longer distance, and the turbulent flow 424 over the fourth device 410d may be turned into a laminar flow.

Such actuation of the first device 410a to modify fluid flow at a remote location can be based on a measurement of a fluid flow characteristic of the ambient fluid in a space remote from the first, second, and third electrodes of the first device 410a. For example, the fourth device 410d may be operated in the first mode to determine presence of turbulence based on the measured fluid flow characteristics. Then the process 300 for feedback operation can be readily applied, where the turbulence indicator signal is now generated by the fourth device 410d (step 310), and a common control system across the devices 410a-410d determines whether turbulence is present (step 320). The common control system determines the third voltage to be applied (step 330), and applies the third voltage to the electrodes of the first device 410a (step 340) to reduce the turbulence measured at the fourth device 410d. The generalization of the process 300 can likewise be applied across the devices 410a-410d. Such distributed sensing and actuation over the surface 401 may enable improved control over fluid flow modification, which may not be possible based solely on local sensing and actuation of individual devices.

While the operation of the linear arrangement 402 is described using sensing and actuation of individual devices 410, in some implementations, the sensing and actuation can take place between the electrodes of the individual devices 410. For example, a first electrode 414b of the second device 410b and a third electrode 415a of the first device 410a and a second electrode 416c of the third device 410c can be selected to operate as a sensor-actuator device having a device geometry different from the underlying devices 410a-410c. Such selected electrodes can be driven, by the common control system, with a first, second, third, and fourth voltages as previously described to perform sensing and actuation operations. Due to the change in geometry, the first, second, third, and fourth voltages may be increased. Such selection of electrodes across different devices for operation as a sensor-actuator device can enable dynamic variation in electrode separation distances, which can provide an additional degree of freedom in controlling the linear arrangement 402, and more generally in controlling a distributed system of devices 410.

Figure 5A:
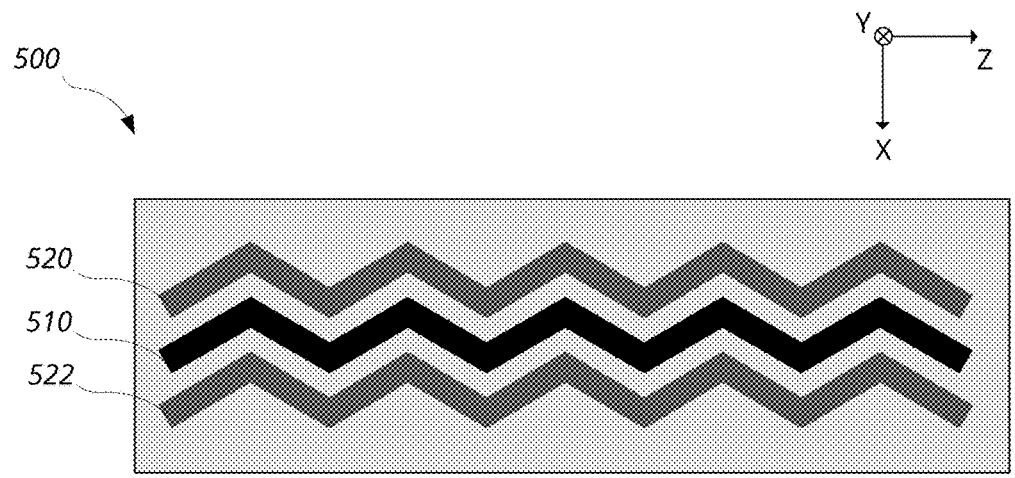
FIGS. 5A-5B show schematics of various geometries of electrodes of the combined plasma sensor-actuator device.
Figure 5B:
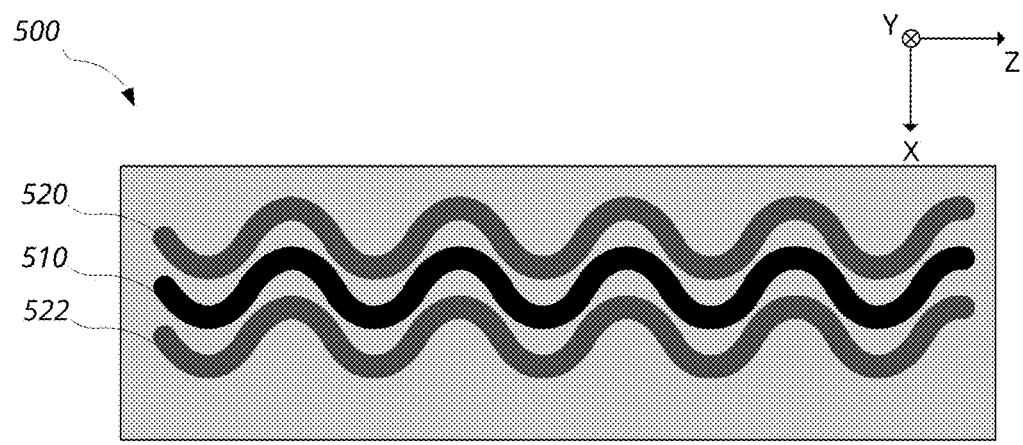

While strip-shaped electrodes are shown in FIGS. 4A and 4B, in general, the electrodes can have various shapes. Referring to FIGS. 5A and 5B, schematics of various geometries of electrodes of a combined plasma sensor-actuator device 500 are shown. First, second, and third electrodes 510, 520, and 522 may be formed in various shapes in addition to the previously described strip geometry. For example, the electrodes 510, 520, and 522 can generally extend along a third direction (e.g., in the +Z or −Z direction), but not parallel to the third direction. Various geometries of the electrodes of the device 500 may enhance actuation efficiency of the device, increase longevity of the device, and/or change flow characteristic modification property of the device 500.

Referring to FIG. 5A, the electrodes extend in a zig-zag manner. The first electrode 510 extend at a first angle with respect to the Z-axis in the +Z direction, then change direction and extend at a second angle with respect to the Z-axis in the +Z direction and repeat to form the zig-zag shape, or a triangular wave shape. The first angle and the second angle may be same in magnitude and opposite in sign. Due to the non-zero angle formed by the first electrode 510 with respect to the Z-axis, the first electrode 510 is not parallel to the Z-axis, but generally extends along the Z-axis.

The second and third electrodes 520 and 522 similarly extend in alternating directions to form the zig-zag shape. The second and third electrodes track the shape of the first electrode 510, and as a result, a constant lateral separation between pairs of electrodes is maintained across the lengths of the electrodes.

Referring to FIG. 5B, the electrodes have a sinusoidal shape. The first electrode 510 oscillates along the X-axis while extending in the +Z direction to form a sinusoidal shape. Due to the sinusoidal shape of the first electrode 510, the first electrode 510 is not parallel to the Z-axis, but generally extends along the Z-axis. The second and third electrodes 520 and 522 similarly have a sinusoidal shape. The second and third electrodes track the shape of the first electrode 510, and as a result, a constant lateral separation between pairs of electrodes may be maintained across the lengths of the electrodes. In some implementations, a spatial frequency of the sinusoidal shape may change while the electrodes extend in the third direction. Additionally, or alternatively, an amplitude of the sinusoidal shape may change while the electrodes extend in the third direction.

Other variations in shapes of electrodes are possible. Examples of other shapes of the electrodes include sawtooth shape, square-wave shape, sinusoidal shape with straight sections inserted every half of a period, serrated shape, and scalloped shape.

Figure 6:
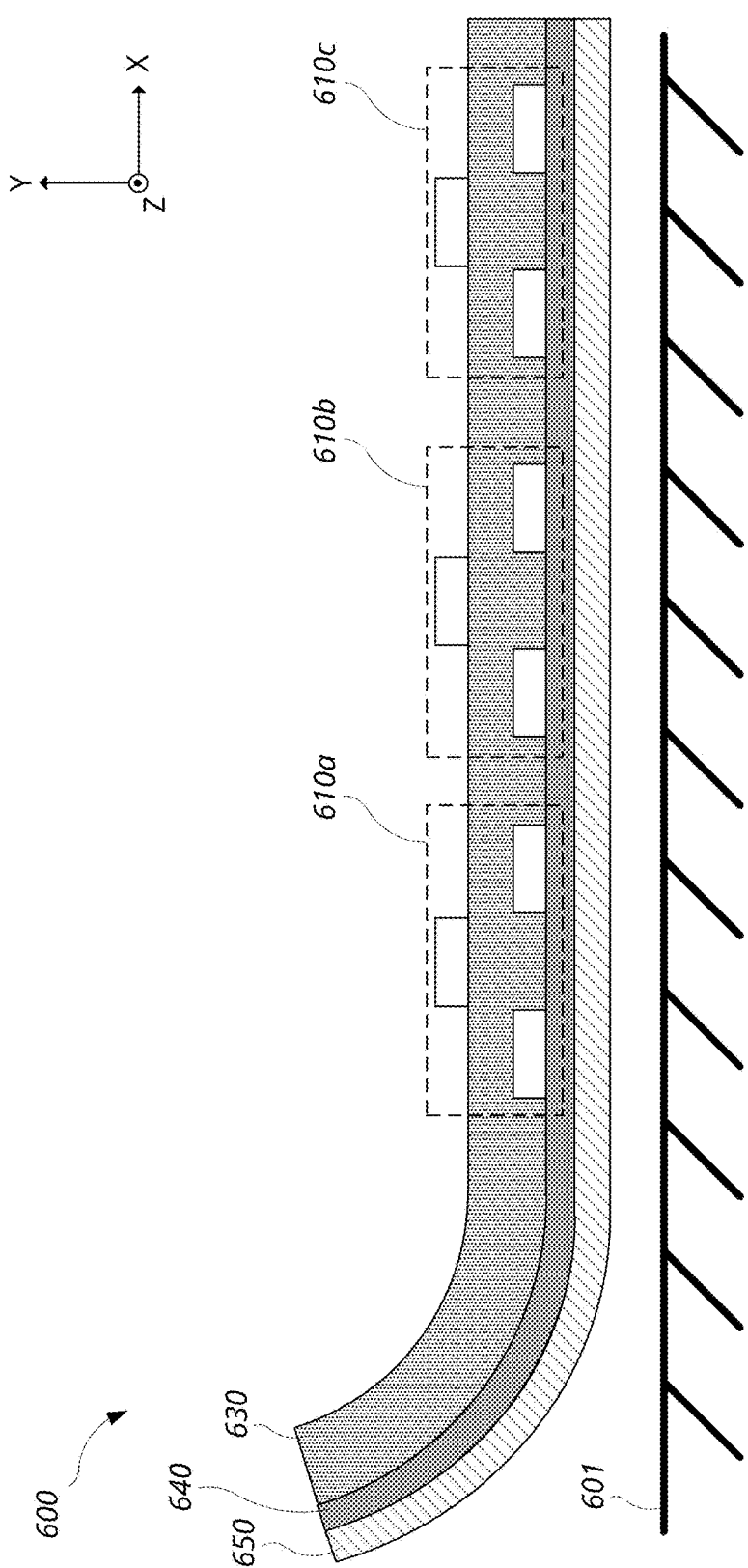
FIG. 6 shows a schematic cross-section of an array of combined plasma sensor-actuator devices provided in a planar, tape-like form factor with an adhesive backing.

Referring to FIG. 6, a schematic cross-section of an array of combined plasma sensor-actuator devices 610 provided in a planar, tape-like form factor with an adhesive backing is shown ("adhesive wrap 600"). The adhesive wrap 600 provides a convenient method of implementing multiple sensor-actuator devices on a surface 601. The adhesive wrap 600 includes multiple devices 610a through 610c (collectively 610), an insulating layer 630, a substrate 640, and an adhesive layer 650. The insulating layer 630 may provide the insulating layer 130 of device 100, and the second and third electrodes of the devices 610 are embedded in the insulating layer 630. The substrate 640 can be an insulating substrate to provide electrical isolation from the surface 601, which may be conductive. The first, second, and third electrodes are supported by the substrate 640, and the adhesive layer 650 is attached on a side of the substrate opposite to the devices 610. The adhesive wrap further includes pre-configured electrical connections to the electrodes of the devices 610.

While substrate 640 and adhesive layer 650 are shown to be separate in the example shown, they may be combined into a single adhesive backing that can provide both adhesion to the surface 601, support for the devices 610, and adhesion to the insulating layer 630.

The adhesive wrap 600 can conveniently implement a distributed system of the sensor-actuator devices 610 over the surface 601. The adhesive wrap can be applied to various surfaces, such as a surface of a bluff body, to enable control over drag, turbulence, or combination thereof at or around the surface 601 of various objects. For example, the wrap can be wrapped around a tether of an airborne wind turbine, such as an energy kite, to reduce drag created by the tether.

An airborne wind turbine (AWT) is an alternative to the wind turbine towers that can be used to harness wind energy. Example of an AWT system includes an aerial vehicle constructed of a rigid wing with mounted turbines. The aerial vehicle can fly in a path across the wind, such as a substantially circular path above the ground or water to convert kinetic wind energy to electrical energy. The rotors attached to the rigid wing can generate power by driving a generator. The aerial vehicle can transmit the generated power to a ground station with an electrically conductive tether.

Reduction in drag can lead to improved power generation of such airborne wind turbines through reduction in drag-related power losses. Additionally, reduced drag can reduce wind loading on the tether, which can reduce structural requirements of the tether (e.g., the tether can be made lighter and/or thinner).

Figure 7A:
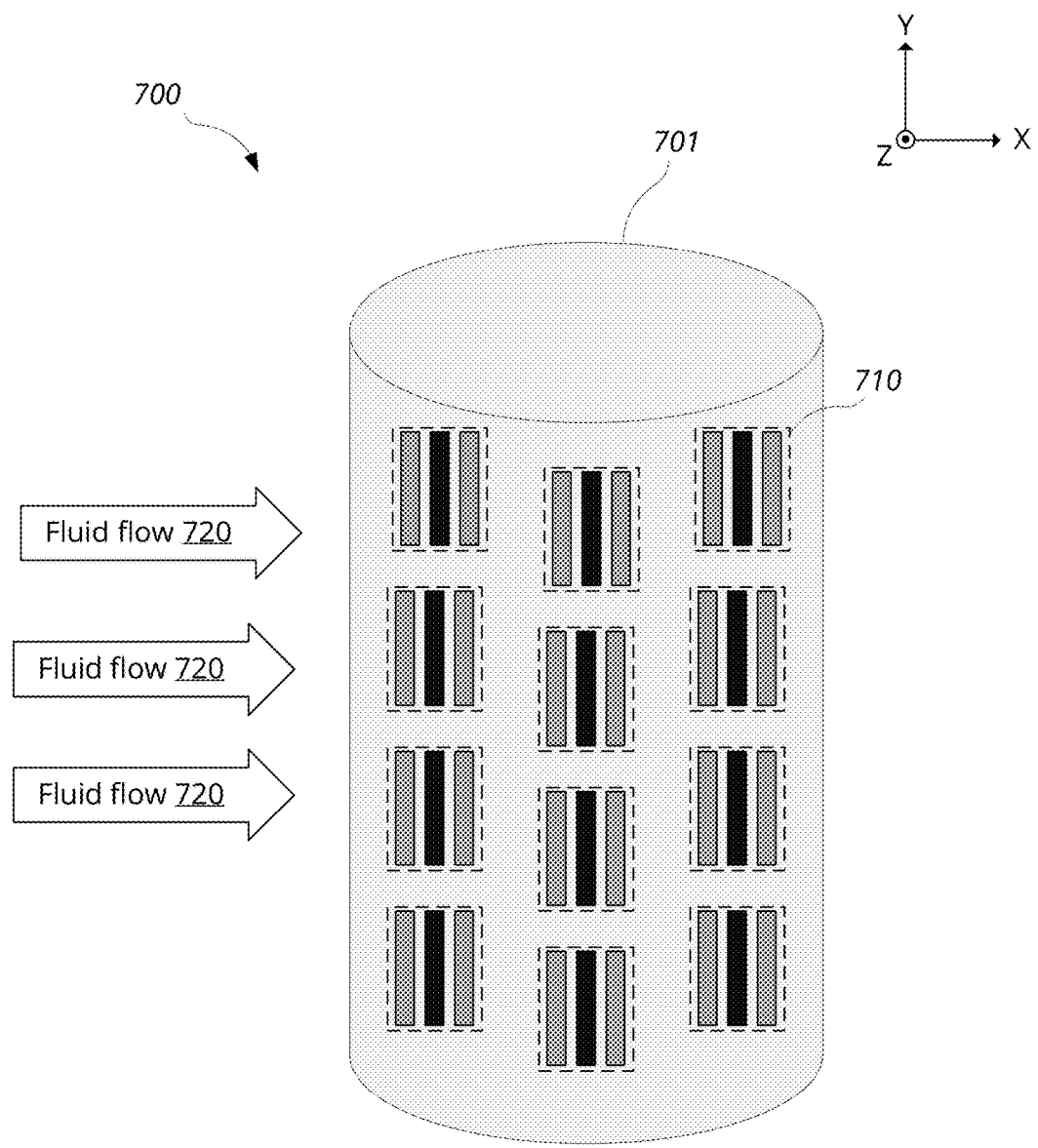
FIGS. 7A-7D show schematics of a tether of an energy kite implementing arrays of the combined plasma sensor-actuator devices.
Figure 7B:
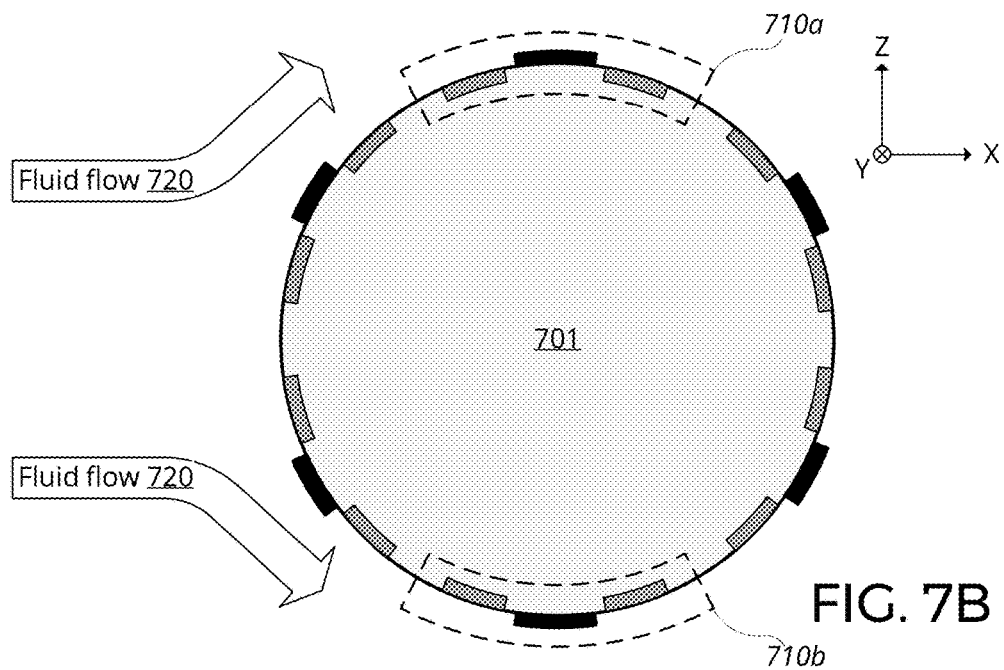
Figure 7C:
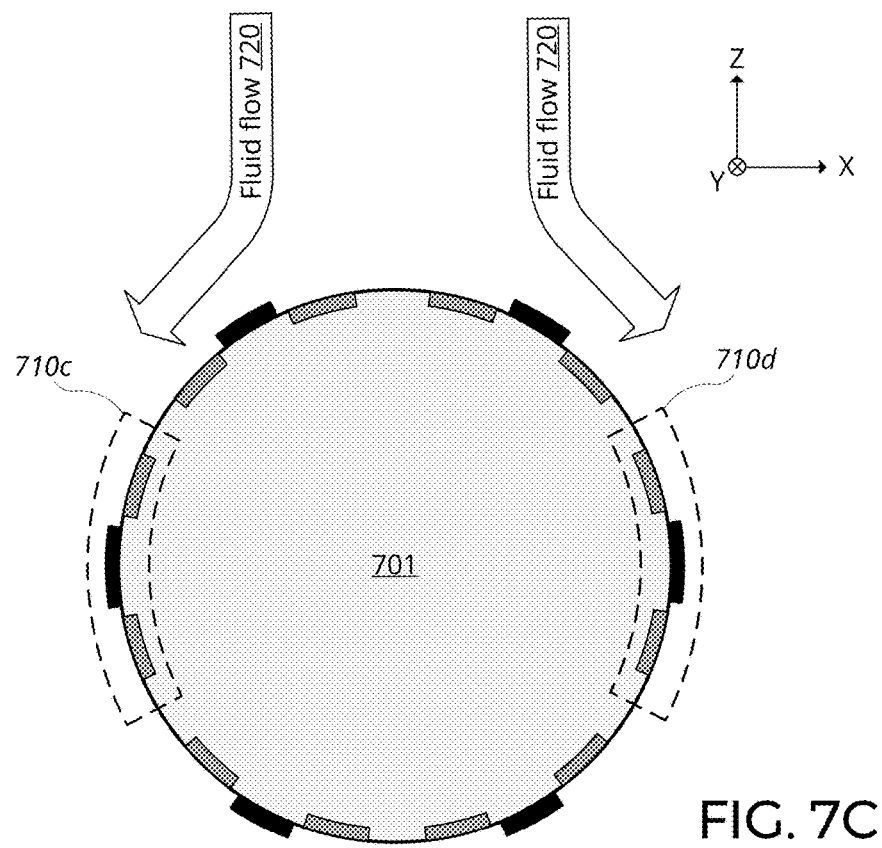

Referring to FIGS. 7A-7C, schematics of a tether 701 of an energy kite implementing arrays of the combined plasma sensor-actuator devices are shown. The array of devices form a distributed system 700 of sensor-actuator devices 710. The tether 701 is an example of a bluff body, and the distributed system 700 can be operated to control turbulence and wind loading and respond to changing characteristics of a fluid flow 720.

Referring to FIG. 7A, a section of the tether 701 is shown. The tether 701 is oriented in the vertical (+Y) direction, and the fluid flow 720 is incident on the tether 701 from left to right in the +X direction at a given time. Now referring to FIG. 7B, a cross-sectional view of the tether 701 in such a situation is shown. The tether 701 has multiple devices 710 distributed around its circumference, including the devices 710a and 710b.

When the fluid flow 720 reaches the tether 701, the flow 720 initially starts to flow around the tether 701. However, as the tether 701 is a bluff body, the fluid flow may start to separate from the surface of the tether 701 when the flow reaches devices 710a and 710b, generating turbulence. The distributed system 700 may sense the separation of fluid flow 720 through measurements of the fluid flow characteristics at various locations of the tether 701. For example, the turbulence may be detected by devices 710a and 710b. Alternatively, or additionally, the turbulence may be detected by the two downstream devices located further right of the devices 710a and 710b.

In response to detection of the turbulence, one or more devices may be actuated in an attempt to reduce or increase the turbulence. For example, devices 710a and 710b can be actuated, which may promote adhesion of the fluid flow 720 to the surface of the tether 701. As a result, the magnitude of the turbulence may be reduced. Additionally, or alternatively, the location of the turbulence may be moved further downstream in the +X direction, reducing the impact of the turbulence on the tether 701.

In general, the fluid flow 720 may come from any direction. For example, for the tether 701 of an energy kite, the wind direction may, over time, vary in any direction along the X-Z plane. Furthermore, the wind speed and direction may also vary across the length of the tether 701. As such, the actuation of the devices may have to change to adapt to the changing wind direction.

Referring to FIG. 7C, the fluid flow has now changed direction, flowing from the top to the bottom in the −Z direction. As the distributed system 700 includes multiple devices 700 along the circumference of the tether 701, the system may now detect presence of turbulence at devices 710c and 710d. In response to the detection of turbulence, the devices 710c and 710d may be actuated to control the turbulence.

Figure 7D:
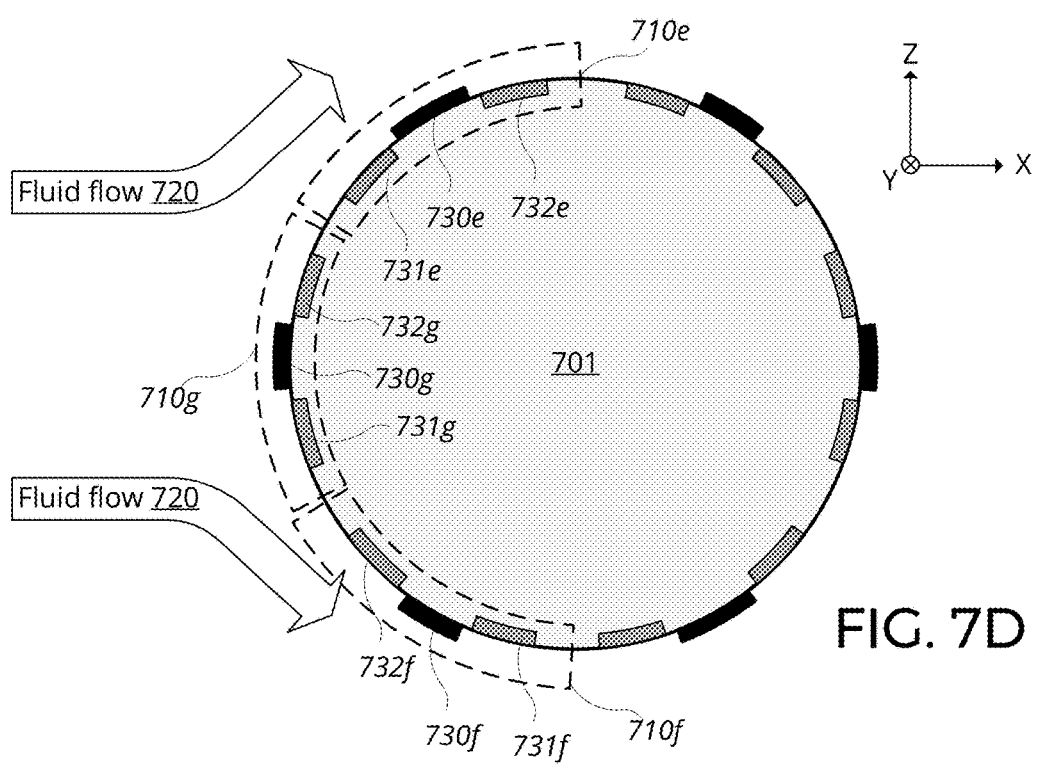

Referring to FIG. 7D, one or more measurements of local fluid flow speed by the devices 710 can be analyzed by the distributed system 700 to determine a direction of the fluid flow 720. The devices 710 include respective first, second, and third electrodes 730, 731, and 732. In this example, the fluid flow 720 is incident squarely on the device 710g, and flows around the tether 701 over the devices 710e and 710f. In such a situation, a measurement by the device 710e may indicate a flow in a direction from the first electrode 730e to the third electrode 732e, and a measurement by the device 710f may indicate a flow in a direction from the first electrode 730f to the second electrode 731f.

Based on the known geometry of the distributed system 700, such as the relative locations of the devices 710e and 710f on the tether 701, the direction of the fluid flow 720 can be determined from the measurements made by the devices 710. For example, due to the cylindrical shape of the tether 701, the fluid flow 720 is expected to split symmetrically around the tether 701, resulting in equal flow speeds at symmetrical points around the tether with respect to the incident direction of the fluid flow. In this case, as the devices 710e and 710f are symmetrically located around the tether 701 with respect to the incident direction of the fluid flow, the absolute value of the measured wind speed may be approximately equal. Based on that information, the distributed system 700 can determine the fluid flow 720 to be incident on the tether 701 at a midpoint between the two devices 710e and 710f, aligned with the +X direction.

Additional measurements from additional devices 710 can be used to confirm the determined direction of fluid flow and/or improve the accuracy of the determination. In this case, the fluid flow 720 is incident squarely on the device 710g, affecting the two plasmas regions of the device 710g in substantially the same manner. As such, the measured difference ΔI, and hence the measured flow speed, between the two pairs of electrodes of the device 710g may be significantly smaller than ΔI measured by the devices 710e and 710f. Such additional measurement can be used by the distributed system 700 as a confirmation that the fluid flow direction is in the +X direction.

Based on the determined direction of the fluid flow 720, the distributed system 700 can actuate one or more devices 710 to achieve various effects. For example, based on the determination that the fluid flow 720 is in the +X direction, the first and second electrodes 730f and 731f of the device 710f can be actuated, and the first and third electrodes 730e and 732e of the device 710e can be actuated to generate respective induced flows that co-propagate with the fluid flow 720 to reduce drag and wind loading on the tether 701. Furthermore, based on the information that the fluid flow 720 is incident squarely on the device 710g, both pairs of electrodes 730g-731g and 730g-732g of the device 710g can be actuated simultaneously to modify wind loading.

The fluid flow direction determination can be generalized for arbitrary directions based on interpolation from the measured local flow speeds from multiple devices 710. For example, in the case of the tether 701 having a cylindrical cross section, when the fluid flow direction changes slightly from the +X direction to have a +Z component, the magnitude of speed measured by the device 710f may decrease while magnitude of speed measured by the device 710e may increase, resulting in a difference in magnitude of measured flow speeds between the two devices. Based on the difference, the fluid flow direction can be determined. For example, various interpolation techniques can be used to determine the incident location of the fluid flow 720, and hence the direction of fluid flow 720, relative to the locations of the devices. In case of a linear interpolation, the difference can be divided by the sum of the magnitude of the two flow speeds, and the resulting fraction can be used to determine the incident location along a line formed between the two devices.

In some implementations, a mathematical model describing distribution of fluid flow speeds around the tether 701 can be generated based on simulations or empirical data, and the multiple local flow speed measurements from the devices 710 can be mathematically fitted to the mathematical model to determine the direction and speed of the fluid flow 720. Such mathematical modeling can be applied to arbitrary shapes, which can enable determination of the direction and speed of the fluid flow 720 for arbitrary shapes.

While adapting to a change in the fluid flow direction along the X-Z plane is shown, in general, the distributed system 700 may adapt to fluid flows from arbitrary directions. For example, the distributed system 700 may be implemented on a spherical object, and the system 700 may be dynamically controlled to modify turbulence and/or drag of the spherical object in response to fluid flow from any directions.

While various operations of the sensor-actuator devices and distributed systems in modifying drag and/or turbulence of an object have been described, in general, body forces applied to the object by the surrounding fluid flow can be controlled and modified.

While the distributed system 700 is implemented on a tether in the foregoing example, in general, the distributed system 700 can be implemented on various structures on which measurement of fluid flow characteristics and modification of fluid flow are desired. Various examples of structures on which the distributed system 700 can be implemented on include bluff bodies and streamlined bodies. For example, the distributed system 700 can be implemented on posts, building exteriors, airplanes, gliders, kite tethers, propellers, rotors, turbines, cars, trucks, boats, sailboats, ropes and lines of sailboats, power lines, space vehicle, rockets, missiles, internal surfaces of a pipe, jet engine air intake, fan blade of a jet engine, and various flow constraining surfaces. Furthermore, the distributed system 700 can be implemented on embodiments where one surface moves relative to another such as a fan blade near a stator or engine housing.

In general, in a distributed system of sensor-actuator devices, the electrodes of the devices may be driven in various ways. The electrodes of different device may be driven in phase, out of phase, or driven without a fixed phase relationship amongst the devices. The electrodes of different devices may also be driven at the same frequency, or at different frequencies. Optimization of phase relations and driving frequencies across the distributed system may enhance performance of the distributed system. While the ambient fluid is described as being in gaseous phase in various instances, the disclosure is not limited to gases. For example, the ambient fluid may be in liquid phase, and plasma may be generated in the liquid-phase ambient fluid. Alternatively, or additionally, the liquid-phase ambient fluid may contain ions that may be electrostatically accelerated, leading to net momentum-transfer to the ambient fluid through collision with other neutral species of the liquid-phase ambient fluid.

Some aspects of the combined plasma sensor-actuator device, system, and method described here can be implemented in digital electronic circuitry, or in computer software, firmware, or hardware, including the structures disclosed in this specification and their structural equivalents, or in combinations of one or more of them. For example, in some implementations, the electronic control module 172 can be implemented using digital electronic circuitry, or in computer software, firmware, or hardware, or in combinations of one or more of them.

The term "electronic control module" encompasses all kinds of apparatus, devices, and machines for processing data and/or control signal generation, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes described above can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computing system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 8:
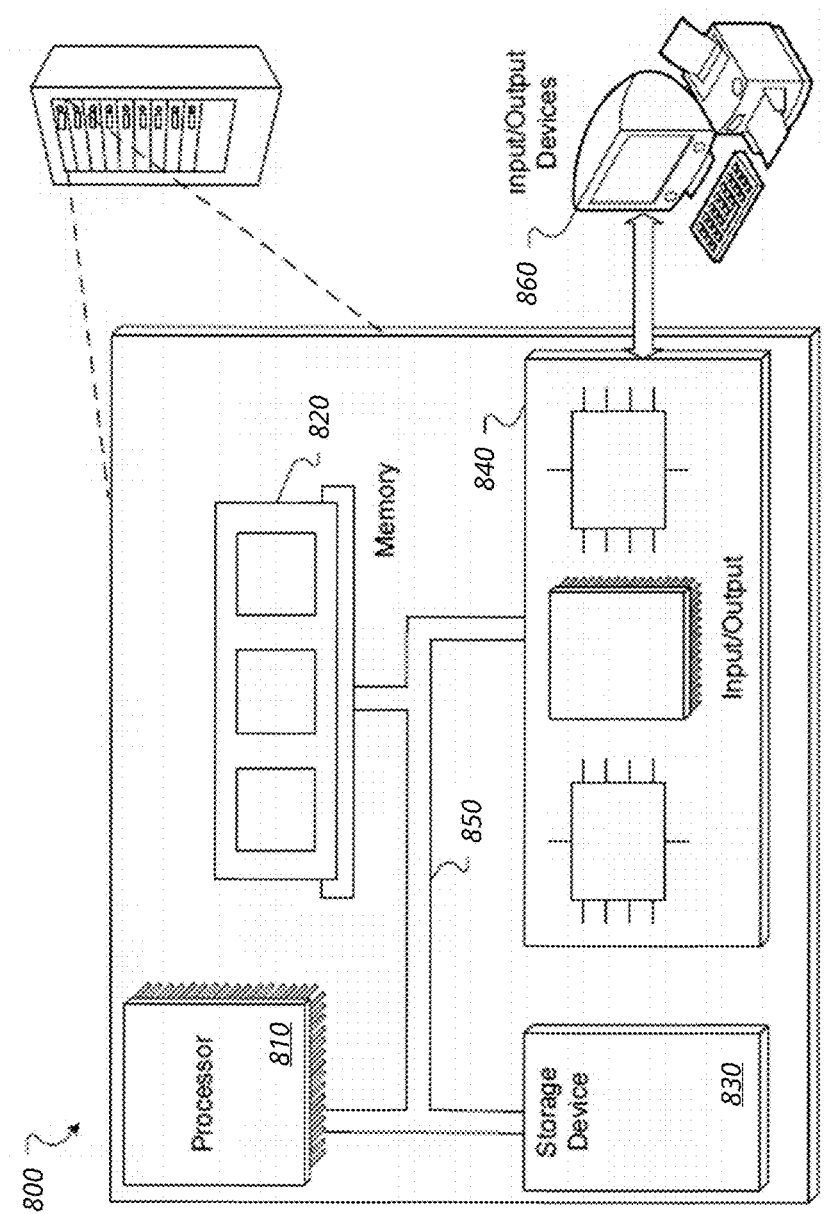
FIG. 8 shows an example computing system.

FIG. 8 shows an example computing system 800 that includes a processor 810, a memory 820, a storage device 830 and an input/output device 840. Each of the components 810, 820, 830 and 840 can be interconnected, for example, by a system bus 850. The processor 810 is capable of processing instructions for execution within the system 800. In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the system 800.

The input/output device 840 provides input/output operations for the system 800. In some implementations, the input/output device 840 can include one or more network interface devices, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 860. In some implementations, mobile computing devices, mobile communication devices, and other devices can be used.

A number of embodiments have been described. Nevertheless, it will be understood that various modifications may be made without departing from the spirit and scope of the invention. Accordingly, other embodiments are within the scope of the claims.

What is claimed is:

1. A method for measuring a fluid flow characteristic of an ambient fluid and modifying fluid flow of the ambient fluid, the method comprising:
  applying a first voltage between a first electrode and a second electrode electrically insulated from the first electrode, the first electrode extending in a plane and the second electrode extending along the plane, the first and second electrodes being laterally spaced apart from each other in a first direction in the plane, the ambient fluid at least partially occupying a first space adjacent to the first electrode,
  wherein the first voltage is sufficient to generate a plasma in the first space;
  simultaneously to applying the first voltage, applying a second voltage between the first electrode and a third electrode electrically insulated from the first electrode, the third electrode extending along the plane and laterally spaced apart from the first electrode in a second direction in the plane opposite the first direction, the ambient fluid at least partially occupying a second space adjacent to the first electrode and opposite to the first space, wherein the second voltage is sufficient to generate a plasma in the second space;

measuring a first current between the first and second electrodes, and a second current between the first and third electrodes;

determining a fluid flow characteristic of the ambient fluid based on a difference between the first and second currents; and applying a third voltage between the first and second electrodes, the third voltage being sufficient to generate a plasma in the first space sufficient to modify fluid flow of the ambient fluid in the first direction in the first space.

2. The method of claim 1, wherein the first current is at least partly due to a flow of the fluid in the first space and the second current is at least partly due to a flow of the fluid in the second space.

3. The method of claim 1, further comprising applying a fourth voltage between the first and third electrodes, the fourth voltage being sufficient to generate a plasma in the second space sufficient to modify fluid flow of the ambient fluid in the second direction in the second space.

4. The method of claim 1, wherein the third voltage is applied based on the fluid flow characteristic of the ambient fluid determined based on the difference between the first and second currents.

5. The method of claim 4, wherein the third voltage is varied based on a time-varying difference between the first and second currents in a feedback or feedforward manner.

6. The method of claim 1, wherein the fluid flow is modified to reduce turbulent flow in the first space.

7. The method of claim 1, wherein the fluid flow is modified from turbulent flow to laminar flow in the first space by application of the third voltage.

8. The method of claim 1, wherein the fluid flow characteristic is determined by filtering a signal corresponding to the difference between the first and second currents.

9. The method of claim 8, wherein the filter is a high-pass filter and a magnitude of a filtered signal corresponds to a magnitude of turbulent flow of the ambient fluid, or the filter is a low-pass filter and a magnitude of a filtered signal corresponds to a laminar flow speed of the ambient fluid.

10. The method of claim 1, further comprising generating a plasma sufficient to modify fluid flow of the ambient fluid in a space remote from the first, second, and third electrodes.

11. The method of claim 1, further comprising applying the third voltage based on a measurement of a fluid flow characteristic of the ambient fluid in a space remote from the first, second, and third electrodes.

12. The method of claim 11, wherein the fluid flow characteristics comprise a fluid flow direction, and wherein the applying of the third voltage based on the measurement of the fluid flow characteristic of the ambient fluid in the space remote from the first, second, and third electrodes comprises:

applying the third voltage based on the measurement of the fluid flow direction of the ambient fluid in a space remote from the first, second, and third electrodes.

13. The method of claim 1, wherein the third voltage is supplied sequentially with the first and second voltages.

14. A device for measuring a fluid flow characteristic of an ambient fluid and modifying fluid flow of the ambient fluid, the device comprising:

a first electrode extending in a plane;

a second electrode extending along the plane, the second electrode being electrically insulated from the first electrode, the second electrode also being laterally spaced apart from the first electrode in a first direction in the plane, the ambient fluid at least partially occupying a first space adjacent to the first electrode;

a third electrode extending along the plane, the third electrode being electrically insulated from the first electrode and the second electrode, the third electrode also being laterally spaced apart from the first electrode in a second direction in the plane opposite to the first direction, the ambient fluid at least partially occupying a second space adjacent to the first electrode and opposite to the first space;

a control system electrically connected to the first, second, and third electrodes, the control system being programmed to operate the device in a first mode and a second mode, wherein during operation in the first mode, the control system:

applies a first voltage between the first and second electrodes and a second voltage between the first and third electrodes, the first voltage being sufficient to generate a plasma in the first space, and the second voltage being sufficient to generate a plasma in the second space;

measures a first current between the first and second electrodes, and a second current between the first and third electrodes; and determines a fluid flow characteristic of the ambient fluid based on a difference between the first and second currents; and wherein during operation in the second mode, the control system:

applies a third voltage between the first and second electrodes, the third voltage being sufficient to generate a plasma in the first space sufficient to modify fluid flow of the ambient fluid in the first direction in the first space.

15. The device of claim 14, wherein during operation in the second mode, the control system applies a fourth voltage between the first and third electrodes, the fourth voltage being sufficient to generate a plasma in the second space sufficient to modify fluid flow of the ambient fluid in the second direction in the second space.

16. The device of claim 14, further comprising a layer of a dielectric material extending along the plane, the first electrode being arranged on an opposite side of the dielectric material from the second and third electrodes.

17. The device of claim 14, wherein the first and second electrodes both extend in a third direction in the plane orthogonal to the first and second directions, the first and second electrodes being spaced apart by a constant amount in the first direction along their lengths.

18. The device of claim 17, wherein the third electrode extends in the third direction in the plane, the first and third electrodes being spaced apart by a constant amount in the second direction along their lengths.

19. The device of claim 17, wherein the first, second, and third electrodes extend parallel to the third direction.

20. The device of claim 17, wherein the first, second, and third electrodes extend non-parallel to the third direction.

21. The device of claim 14, wherein the control system comprises a power supply and an electronic control module, the power supply being electrically connected to the first, second, and third electrodes and in communication with the electronic control module, the electronic control module being programmed to receive signals corresponding to the first and second currents and to send a signal to the power supply to apply the third voltage.

22. The device of claim 14, further comprising a substrate supporting the first, second, and third electrodes and an adhesive material on an opposite side of the substrate from the first, second, and third electrodes.

* * * * *